(12) United States Patent
Kesal et al.

(10) Patent No.: US 7,539,870 B2
(45) Date of Patent: May 26, 2009

(54) MEDIA WATERMARKING BY BIASING RANDOMIZED STATISTICS

(75) Inventors: Mustafa Kesal, Urbana, IL (US); Mehmet Kivanc Mihcak, Redmond, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 10/775,791

(22) Filed: Feb. 10, 2004

(65) Prior Publication Data
US 2005/0175179 A1 Aug. 11, 2005

(51) Int. Cl.
*H04L 9/00* (2006.01)
(52) U.S. Cl. .................................... 713/176
(58) Field of Classification Search ................ 708/400, 708/403; 382/100
See application file for complete search history.

(56) References Cited

U.S. PATENT DOCUMENTS

| | | | | |
|---|---|---|---|---|
| 4,754,492 | A * | 6/1988 | Malvar | 382/268 |
| 5,040,217 | A * | 8/1991 | Brandenburg et al. | 704/200.1 |
| 5,142,656 | A * | 8/1992 | Fielder et al. | 704/229 |
| 5,172,189 | A * | 12/1992 | Mitome | 356/401 |
| 5,479,562 | A * | 12/1995 | Fielder et al. | 704/229 |
| 5,726,758 | A * | 3/1998 | Hasegawa et al. | 356/401 |
| 6,286,100 | B1 | 9/2001 | Morimoto et al. | |
| 6,330,672 | B1 * | 12/2001 | Shur | 713/176 |
| 6,373,965 | B1 * | 4/2002 | Liang | 382/112 |
| 6,418,421 | B1 | 7/2002 | Hurtado et al. | |
| 6,421,802 | B1 * | 7/2002 | Schildbach et al. | 714/747 |
| 6,496,795 | B1 * | 12/2002 | Malvar | 704/203 |
| 6,564,322 | B1 | 5/2003 | Jameson et al. | |
| 6,574,348 | B1 | 6/2003 | Venkatesan et al. | |
| 6,577,744 | B1 | 6/2003 | Braudaway et al. | |
| 6,611,812 | B2 | 8/2003 | Hurtado et al. | |
| 6,794,996 | B2 * | 9/2004 | Tsutsui et al. | 341/50 |
| 6,901,514 | B1 * | 5/2005 | Iu et al. | 713/176 |
| 6,963,842 | B2 * | 11/2005 | Goodwin | 704/500 |
| 6,968,014 | B1 * | 11/2005 | Bobier | 375/271 |
| 6,971,024 | B1 * | 11/2005 | Sako et al. | 713/193 |

(Continued)

OTHER PUBLICATIONS

A.Z Tirkel et al., "A two-Dimensional Digital Watermark", 1995, Monash University.*

(Continued)

*Primary Examiner*—Emmanuel L Moise
*Assistant Examiner*—Nadia Khoshnoodi
(74) *Attorney, Agent, or Firm*—Turocy & Watson, LLP

(57) ABSTRACT

The present invention leverages randomly generated areas with random attributes from two-dimensional media forms to embed information relating to a media's ownership and/or distribution source. This provides a means to establish a media's source despite attacks. By providing embedded user-unique identification, media can enable detection for identifying the source of copied media without the embedded information substantially interfering with the intended purpose of the media itself. In one instance of the present invention, media is transformed into a two-dimensional media form with randomly generated areas having a subset of overlapping areas. User-unique keys are then utilized to determine attributes for each of the areas. This permits creation of statistically unique locations for each user key. The statistical qualities are biased and utilized to determine a logarithmic magnitude watermark value to embed in the media at that location. Detection is performed by utilizing a statistical correlation method to determine a user.

18 Claims, 19 Drawing Sheets

U.S. PATENT DOCUMENTS

| | | | |
|---|---|---|---|
| 7,035,775 B2* | 4/2006 | Abe et al. | 702/189 |
| 7,065,491 B2* | 6/2006 | Tsai et al. | 704/500 |
| 7,248,934 B1* | 7/2007 | Rossum et al. | 700/94 |
| 7,260,488 B2* | 8/2007 | Abe et al. | 702/66 |
| 7,299,189 B1* | 11/2007 | Sato | 704/500 |
| 2001/0049788 A1* | 12/2001 | Shur | 713/179 |
| 2002/0009208 A1* | 1/2002 | Alattar et al. | 382/100 |
| 2002/0061121 A1* | 5/2002 | Rhoads et al. | 382/100 |
| 2002/0136427 A1* | 9/2002 | Staring et al. | 382/100 |
| 2002/0159614 A1* | 10/2002 | Bradley et al. | 382/100 |
| 2003/0009669 A1* | 1/2003 | White et al. | 713/176 |
| 2003/0028381 A1* | 2/2003 | Tucker et al. | 704/273 |
| 2003/0093282 A1* | 5/2003 | Goodwin | 704/500 |
| 2003/0217272 A1* | 11/2003 | Agrawal et al. | 713/176 |
| 2004/0003253 A1* | 1/2004 | Ogino et al. | 713/176 |
| 2004/0042635 A1* | 3/2004 | Epstein et al. | 382/100 |
| 2004/0101160 A1* | 5/2004 | Kunisa | 382/100 |
| 2004/0158724 A1* | 8/2004 | Carr et al. | 713/186 |
| 2005/0207325 A1* | 9/2005 | Sako et al. | 369/275.3 |
| 2005/0226603 A1* | 10/2005 | Hirabayashi et al. | 386/95 |
| 2006/0080538 A1* | 4/2006 | Kusuda et al. | 713/176 |
| 2006/0167683 A1* | 7/2006 | Hoerich et al. | 704/230 |
| 2006/0217968 A1* | 9/2006 | Burges et al. | 704/205 |
| 2007/0092108 A1* | 4/2007 | Alattar et al. | 382/100 |

OTHER PUBLICATIONS

Les Atlas, "Modulation Spectral Transforms Application to Speech Seperation and Modification", Jun. 27, 2003, The Institute of Electronics, Information and Communication Engineers, p. 1-5.*

Doser et al., "Time/Frequency Techniques for Signal feature Detection", 1999, IEEE.*

Li Zhi Cheng, "On Computer the Two-Dimensional (2-D) Type IV Discrete Cosine Transform (2-D DCT-IV", Aug. 8, 2001, IEEE.*

D. Kirovski, H. Malvar, and Y. Yacobi. Multimedia Content Screening Using a Dual Watermarking and Fingerprinting System. Proceedings of the tenth ACM Conference on Multimedia, pp. 372-381, 2002.

Feng Bao. Multimedia Content Protection by Cryptography and Watermarking in Tamper-resistant Hardware. Proceedings of the 2000 ACM Workshops on Multimedia, pp. 139-142, 2000.

A.B. Kahng, J. Lack, W.H. Mangione-Smith, S. Mantik, I.L. Markov, M. Potkonjak, P. Tucker, H. Wang, and G. Wolfe. Watermarking Techniques for Intellectual Property Protection. Proceedings of the 35th annual Conference on Design Automation, pp. 776-781, 1998.

D. Kirovski, H. Malvar, Spread-Spectrum Watermarking of Audio Signals, IEEE Transactions on Signal Processing, Apr. 2003, pp. 1020-1033, vol. 51, No. 4.

* cited by examiner

MEDIA WATERMARKING BY BIASING RANDOMIZED STATISTICS

TECHNICAL FIELD

The present invention relates generally to media watermarking, and more particularly to systems and methods for utilizing biased, randomized statistics to create embedded media watermarks.

BACKGROUND OF THE INVENTION

In order to encourage the sharing of ideas and creativity, countries often provide laws to protect ideas and expressions. Thus, a musician who composes a song has rights in his work to facilitate him in exploiting the work. Without these rights, anyone could claim his efforts and sell them as their own. If this were allowed, the musician would not be as willing to publicly disclose his next song. This, in effect, would deprive the public, in general, of valuable artistic works. The laws that govern the protection of such works generally have been around for many years. However, even if protective laws do exist, they must also be enforced in order for them to be effective. Typically, it is the enforcement process that often limits the value of a law. The intent to enforce may be genuine, but the ability to enforce may be lacking due to limits in technology.

Before the advent of the digital age, tracking of illegally copied goods generally rested on the ability to distinguish the genuine article from an illegal copy. Forensic techniques such as, for example, those relating to painting could be applied to a forged painting to determine its authenticity. With enough available evidence, it might even be possible to decipher who the forging artist is (such as by brush stroke technique, etc.). This type of detective work rests heavily on the availability of physical evidence. However, with the advent of the digital age, ideas and expressions are now reduced down to ones and zeroes, which are much easier to manipulate and duplicate. The digital aspect of these items permits exact duplicates of an original to be created. This typically can be accomplished with no indication whatsoever of which party actually did the copying.

Because of the ease of copying, techniques were developed to facilitate in making it easier to tell a digital original from a digital copy and/or where the digital information originated from. One such technique is to "watermark" a product. The term watermarking originally comes from a technique for marking paper. A paper watermark is usually visible only when the paper is held to a light source. A paper company would often use this technique to mark its name in the paper so that customers would be able to identify it as the maker of the paper. This technique has been modernized to facilitate in identifying the sources in digital (and analog) versions of items such as movies, photographs, and audio products.

The earliest versions of digital watermarking were very distinctive and often interfered with utilizing the product. For example, photographs would have the source printed directly across the photograph, affecting its aesthetics as a trade-off to protecting the object from being copied. This was often accomplished by utilizing a "layer" over the photograph in a digital imaging software product. Thus, in the digital realm, a party could also employ a software product to effectively remove these types of marks digitally. Thus, better ways of embedding the information in the digital data of the photographs have been developed in response to prevent easy removal of the watermarks.

However, despite the progression of digital watermarking technology, one of the drawbacks has been the lack of identifying sources from which parties illegally copy goods. Typically, a company will make multiple copies to disseminate to various distributors for distribution and/or use of the product. The originating company only intends for the product to be utilized as permitted within its legal rights and agreements with those parties that it disseminates its products to. Even if the originating company watermarks its product, illegally copied goods can only be traced back to the originating company. Often this is not, on its face, additional information. For example, a record company producing a new album with a distinctive artist will know from the recordings themselves that the songs originate from its company. Ideally, the originating company would like to know which authorized copy was employed to disseminate its product illegally. This would permit the company to take legal action against the guilty party who allowed the product to be copied.

Technology utilized today permits various types of watermarking to be achieved, but with varying degrees of success. Often the watermark interferes with the use of a product. For example, one would not particularly enjoy listening to a song with an audible watermark that affects the enjoyment of the music. To be effective, a technology must provide virtually undetectable incorporation of a watermark into a product, while still maintaining robust protection of the watermark itself. It is also significant that watermarks cannot be removed and/or impersonated by unauthorized parties and that they contain enough inherent secrecy (i.e., security).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to media watermarking, and more particularly to systems and methods for utilizing biased, randomized statistics to create embedded media watermarks. Randomly generated areas with random attributes from two-dimensional media forms, such as, for example, those forms generated by Modulated Complex Lapped Transformation (MCLT), are leveraged to embed information relating to a media's ownership and/or distribution source. This provides a means to establish a media's source despite malicious and/or non-malicious attacks. By providing embedded user-unique identification, media can enable mark detection for identifying the source of copied media without the embedded information substantially interfering with the intended purpose of the media itself. In one instance of the present invention, media is transformed into a two-dimensional media form with randomly generated areas having a subset of overlapping areas. User-unique keys are then utilized to determine attributes or "entry values" for each of the randomly generated areas. This permits creation of statistically unique locations for each user key. The statistical qualities are biased and then utilized to determine a logarithmic magnitude watermark value to embed in the original media at that location. Detection of the watermark, in one instance of the present invention, is performed by utilizing a statistical correlation method and a predetermined threshold to determine a particular user.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
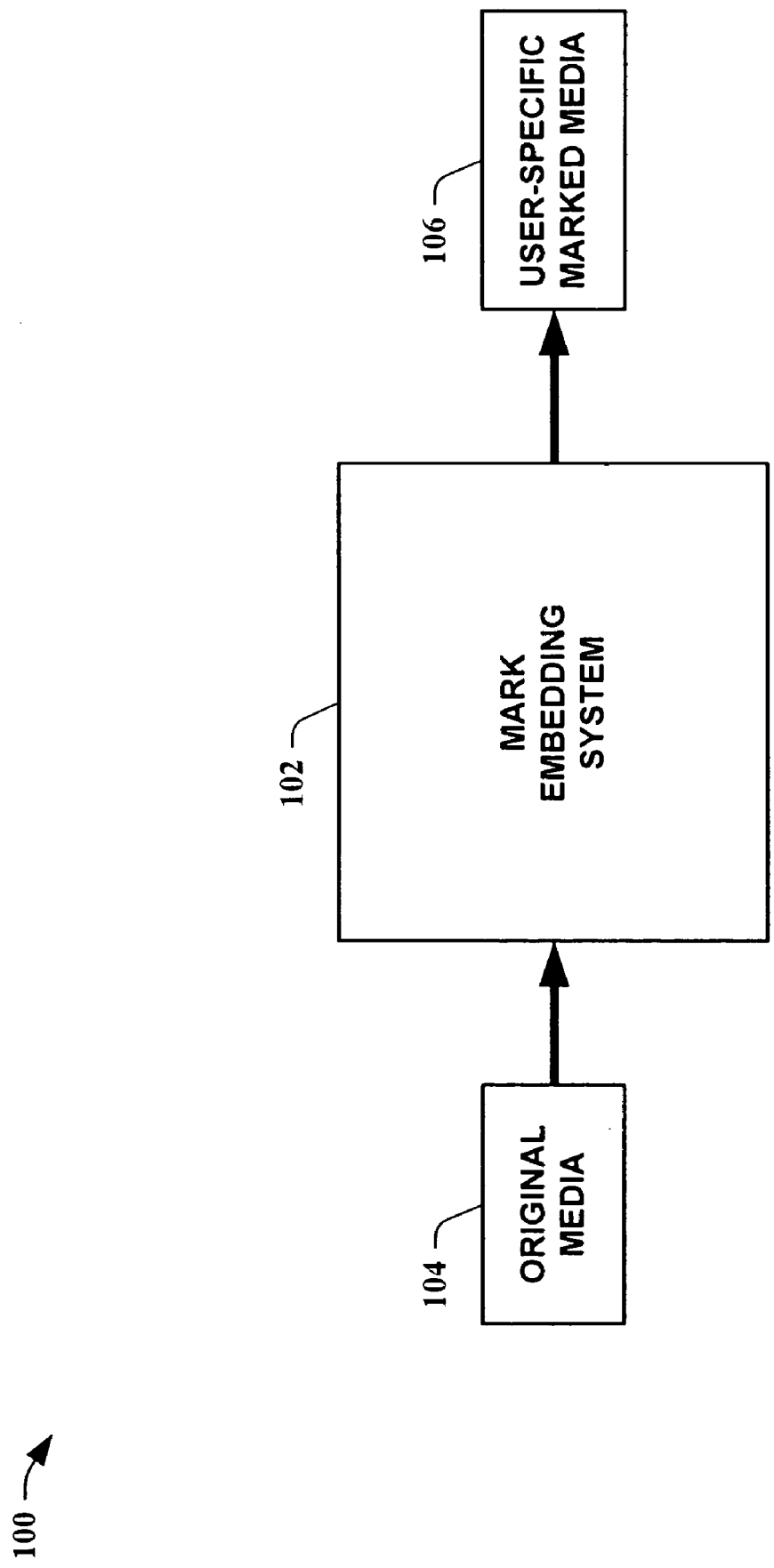
FIG. 1 is a block diagram of a media watermark embedding system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides watermark embedding and/or detection systems and methods for media. Media can include, but are not limited to, audio, images, and video and the like. The systems and methods provide robustness against malicious (such as geometric types of attacks) and non-malicious attacks (such as degradation of the media due to compression and the like). The present invention can be utilized with such media, for example, as audio signals and the like to provide user and/or source identifiable watermarks. It provides security against estimation-like cryptographic attacks and is robust against malicious and/or non-malicious modifications (e.g., compression, noise addition, editing and/or compression along time, dynamic range processing attacks such as scaling, etc.) while keeping the false positive probability low (not accusing a false user) via utilization of a correlation threshold. It is also possible to use two or more separate groups of keys to create a plurality of user-unique watermarks that can be employed together to further increase watermark robustness and detection probability. Thus, the present invention provides for detection of unique users (if any) with a reasonable probability of error.

Typical spread spectrum watermarking techniques are susceptible to geometric attacks such as time shifting. Other techniques have improved upon the vulnerability of the spread spectrum techniques but have introduced a high level of redundancy in their techniques which has resulted in decreased security due to the repetition, revealing obvious patterns. These patterns are then utilized by attackers to significantly destroy the watermarking. The present invention provides robustness against these types of attacks as well as others. It also provides this watermark capability at a low computational cost by limiting embedding locations on a per unit basis, such as, for example, on a per time unit basis.

In FIG. 1, a block diagram of a media watermark embedding system 100 in accordance with an aspect of the present invention is shown. The media watermark embedding system 100 is comprised of a mark embedding system 102. The mark embedding system 102 receives an original media input 104 and provides a unique, user-specific marked media output 106. The mark embedding system 102 employs biased, randomized statistics to embed a user-unique watermark into the original media input 104, creating the user-specific marked media output 106. The user-unique watermarks are established by utilizing a user-specific key to create user-specific statistics that are then employed to create, in one instance of the present invention, logarithmic magnitude delta changes to the original media input 104 at specific locations. In one instance of the present invention, transformations are performed on one-dimensional signals to produce two-dimensional representations of the media. The statistics are applied to the two-dimensional signal via random "areas" of the two-dimensional media forms. The statistical implementation is discussed in more detail infra.

Figure 2:
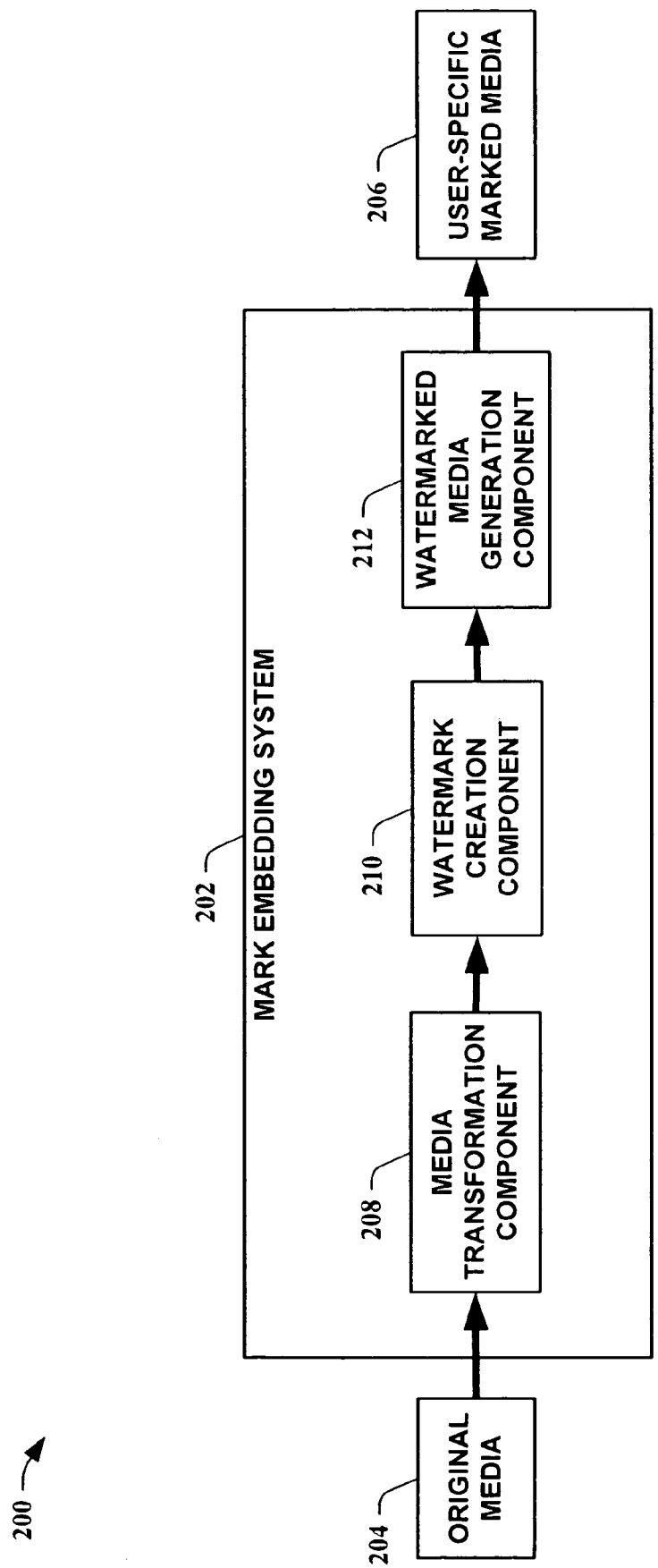
FIG. 2 is another block diagram of a media watermark embedding system in accordance with an aspect of the present invention.

Referring to FIG. 2, another block diagram of a media watermark embedding system 200 in accordance with an aspect of the present invention is illustrated. The watermark embedding system 200 is comprised of a mark embedding system 202. The mark embedding system 202 receives an original media input 204 and produces a user-specific marked media output 206. It 202 is comprised of a media transformation component 208, a watermark creation component 210, and a watermarked media generation component 212. The media transformation component 208 transforms the original media input 204 into a two-dimensional form. In one instance of the present invention, for example, an MCLT technique is applied to an audio signal to transform it into a two-dimensional representation. This allows application of statistical techniques to random areas of the two-dimensional form. One skilled in the art will appreciate that if the original media input 204 is already in a two-dimensional form, transformation may not be required, thus, making the media transformation component 208 an optional component of the mark embedding system 202. The watermark creation component 210 receives the two-dimensional form of the original media input 204 and employs biased, randomized statistics to areas of the two-dimensional form to create appropriate watermarks that pertain to a specific user. In one instance of the present invention, a user-unique key is employed to create the watermark. In another instance of the present invention, a plurality keys are employed to create separate, distinct watermarks for a single user. Creation of the watermarks is discussed in detail infra. The watermarked media generation component 212 receives the watermarks created by the watermark creation component 210 and generates a watermarked version of the original media input 204 that is output as the user-specific marked media output 206. Generation of the watermarked version can include, but is not limited to, combining a watermark created from a single key for a single user and/or combining separately generated watermarks created from different keys for a single user with the original media input 204.

Figure 3:
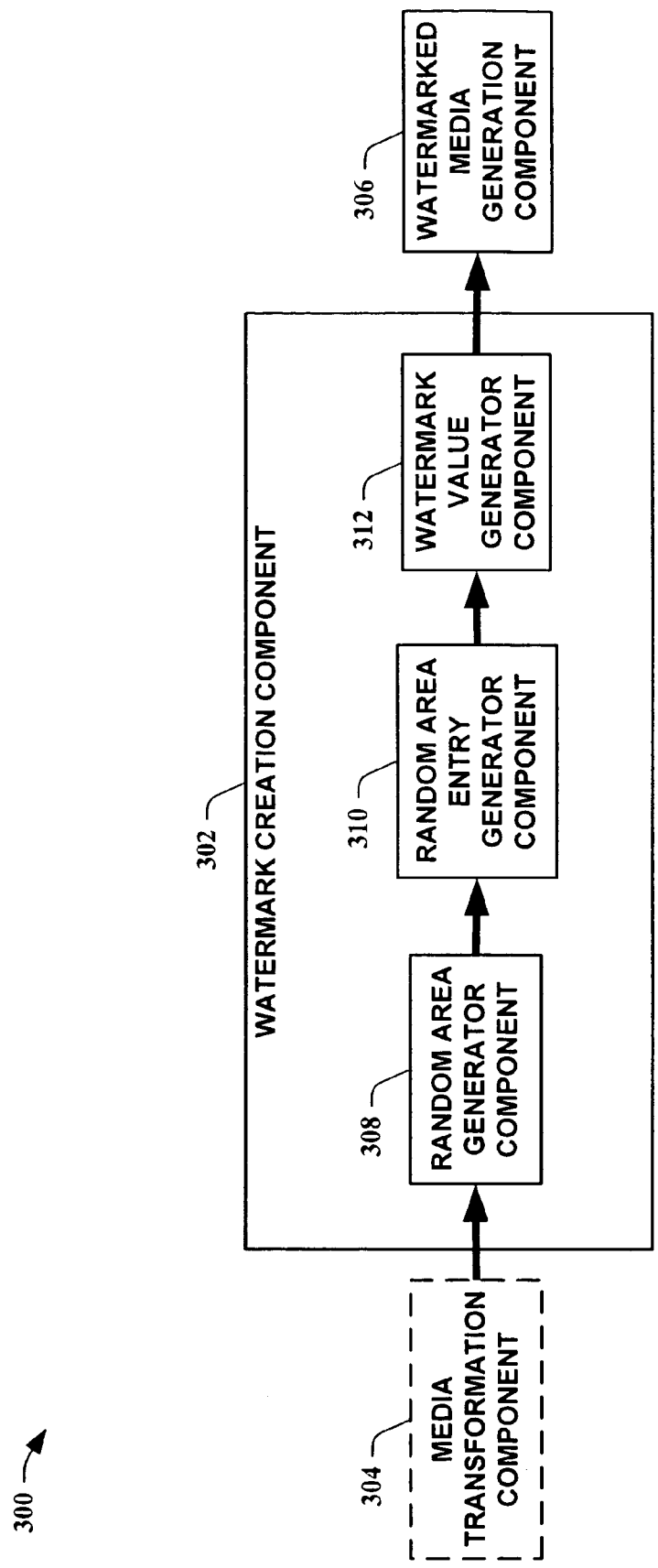
FIG. 3 is a block diagram of a mark embedding system in accordance with an aspect of the present invention.

Turning to FIG. 3, a block diagram of a mark embedding system 300 in accordance with an aspect of the present invention is depicted. The mark embedding system 300 is comprised of a watermark creation component 302, an optional media transformation component 304, and a watermarked media generation component 306. The watermark creation component 302 is comprised of a random area generator component 308, a random area entry generator component 310, and a watermark value generator component 312. As noted previously, the media transformation component 304 transforms a media input into a two-dimensional form and may not be required (i.e., optional) if the media input is already in a two-dimensional form. Thus, the random area generator component 308 receives a two-dimensional form of a media input and randomly generates areas relating to the two-dimensional form. In one instance of the present invention, the generated areas are rectangles. However, the generated areas can also include other geometric shapes such as squares, circles, triangles, and the like. The generated areas have at least a subset of areas that overlap. The random area entry generator component 310 assigns an entry value to each random area generated by the random area generator component 308. A user-unique key is utilized during the assigning to provide user-uniqueness to the entry values. Entry values can include, but are not limited to, such values (i.e., area coefficients) as "+1" and "−1" and the like. When coefficients +/−1 are utilized, they are sometimes referred to as "signs" (i.e., plus/minus values) of the random areas. Any entry value system that can provide a statistical basis for the random areas can be employed. The watermark value generator component 312 utilizes biased, randomized statistics to determine a value to be utilized for the watermark. In one instance of the present invention an MCLT transformation can be performed on an audio signal to provide a two-dimensional form of the media. The value of the watermark is then determined based upon a logarithmic magnitude scale (e.g., dB units, etc.). This value is then added to the media at a location selected for determining the biased, randomized statistics that are employed to determine the watermark value. The biased, randomized statistics are determined for the location by utilizing the entry values assigned to all random areas that overlap the location. Thus, each coefficient (entry value) of each overlapping random area for that location contributes to the statistics. If bi-value entry values are utilized, counts of each type of value, such as, for example, number of plus signs assigned to each random overlapping area and number of minus signs assigned to each random overlapping area at the location, can be employed as a basis for biasing statistics for the location. This is discussed in more detail infra. The determined values are then utilized by the watermarked media generation component 306 to create user-specific marked media.

Figure 4:
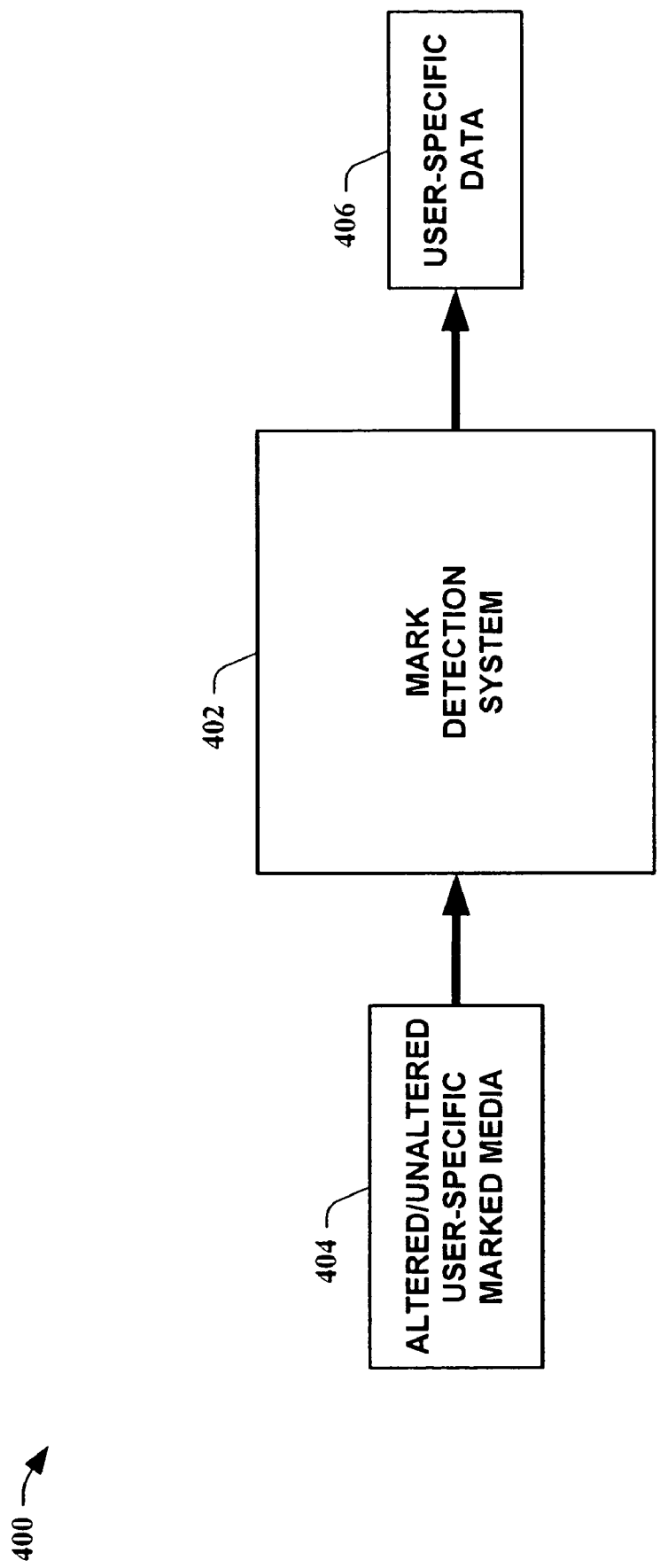
FIG. 4 is a block diagram of a media watermark detection system in accordance with an aspect of the present invention.

In FIG. 4, a block diagram of a media watermark detection system 400 in accordance with an aspect of the present invention is shown. The media watermark detection system 400 is comprised of a mark detection system 402. The mark detection system 402 receives an altered/unaltered user-specific marked media input 404 and detects watermarks related to a specific user. The specific user is then identified and this information is output as user-specific data output 406. The mark detection system 402 utilizes statistical correlation and a predetermined correlation threshold to determine if a specific user's watermark exists in the altered/unaltered user-specific marked media 404. If the watermark is comprised of multiple distinct watermarks based on different keys for a single user, each separate watermark is detected while the other watermark is processed as noise. Then a determination can be made, based on detection of either key, that a specific user's watermark is present. This provides added robustness to the watermarking provided by the present invention.

Figure 5:
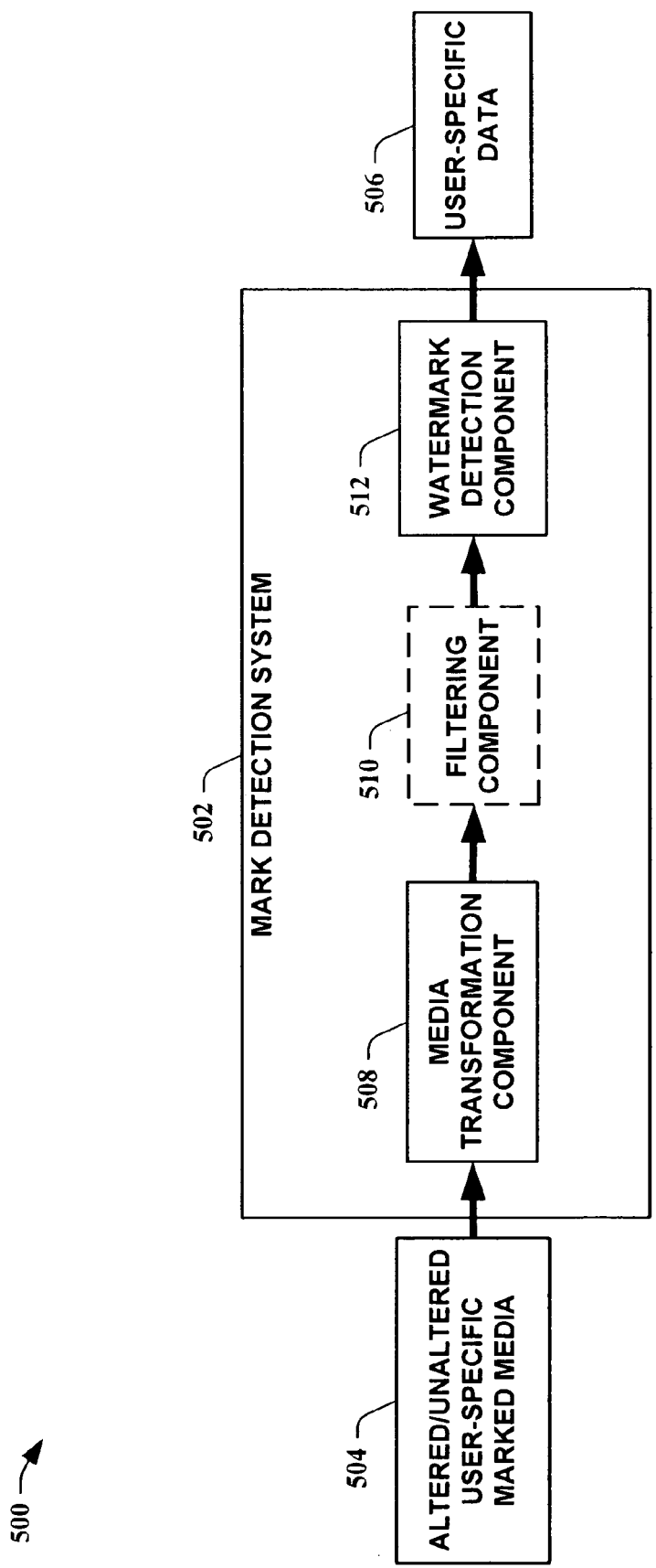
FIG. 5 is another block diagram of a media watermark detection system in accordance with an aspect of the present invention.

Looking at FIG. 5, another block diagram of a media watermark detection system 500 in accordance with an aspect of the present invention is depicted. The media watermark detection system 500 is comprised of a mark detection system 502. The mark detection system 502 receives an altered/unaltered user-specific marked media input 504 and provides a user-specific data output 506. The user-specific data output 506 indicates what user a detected watermark is associated with. The mark detection system 502 is comprised of a media transformation component 508, an optional filtering component 510, and a watermark detection component 512. The media transformation component 508 transforms the altered/unaltered user-specific marked media input 504 into a two-dimensional form. As noted previously, if the marked media input 504 is already in a two-dimensional form, then the media transformation component 508 may become an optional component. The filtering component 510 provides preprocessing filtering for the watermark detection component 512. The preprocessing filtering can include, for example, Cepstrum filtering and the like. The watermark detection component 512 utilizes statistical correlation techniques to determine if a specific user's watermark exists. The correlation must surpass a predetermined threshold that is selected to ensure a high probability of correct correlation (i.e., a low probability of false positives). In general, the correlation techniques utilized by the watermark detection component 512, in one instance of the present invention, include employing an inner product of vectors based upon average values of coefficients of the random areas of the two-dimensional form and key-based assignments of entry values for the random areas of the two-dimensional form, respectively.

Figure 6:
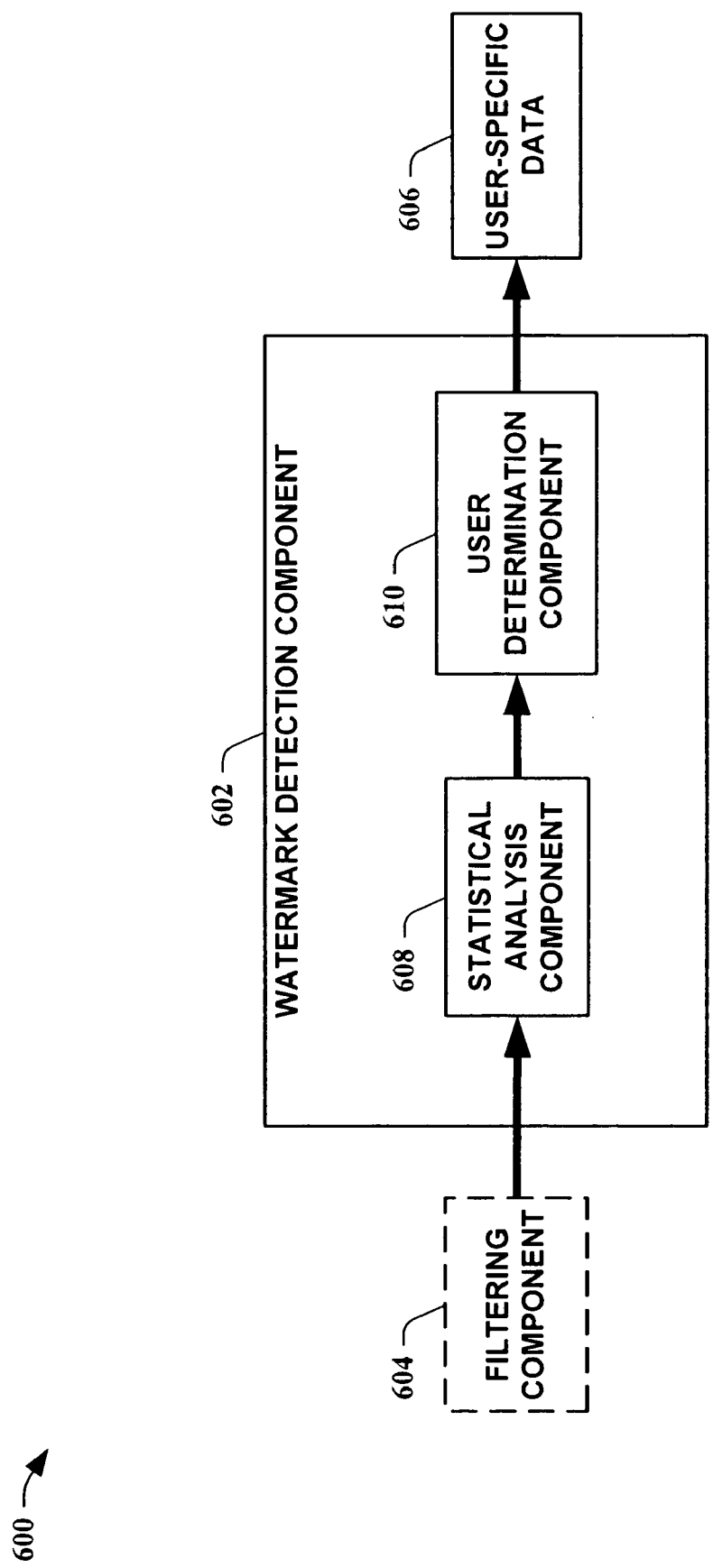
FIG. 6 is a block diagram of a mark detection system in accordance with an aspect of the present invention.

Referring to FIG. 6, a block diagram of a mark detection system 600 in accordance with an aspect of the present invention is shown. The mark detection system 600 is comprised of a watermark detection component 602 and an optional filtering component 604. The watermark detection component 602 outputs a user-specific data output 606 indicating which user a detected watermark is associated with. The watermark detection component 602 is comprised of a statistical analysis component 608 and a user determination component 610. The statistical analysis component 608 performs a correlation process on either filtered and/or unfiltered two-dimensional form of media received from the filtering component 604 and/or other means such as a media transformation component and/or a direct two-dimensional media source. The statistical analysis component 608 provides statistical correlation process noted supra that involves an inner product of two vectors, one based on mean values of coefficients of random areas of the two-dimensional form of the media and one based on key-based entry values (coefficients) assigned to the random areas of the two-dimensional form of the media for a particular user. The inner product should produce a result of approximately zero if that particular user's watermark is not found in the media. However, due to various types of attacks, malicious and/or non-malicious, a slight variation can occur. Thus, the user determination component 610 utilizes a threshold correlation value that is predetermined and employed as a decision point for determining if that specific user's watermark is present or not. In a multiple watermark instance of the present invention, the statistical analysis component 608 provides a plurality of sets of statistics for each watermark to the user determination component 610. The component 610 maximizes the decision statistics given a particular user to check for a user that yields a value beyond a decision threshold, indicating that the combined watermarks are associated with that particular user.

Thus, the present invention provides watermarking systems and methods that provide robustness against attacks, such as, for example, signal processing estimation attacks for media such as, for example, audio. In order to better illustrate the present invention, an example of one instance of the present invention utilizing audio media is presented. One skilled in the art will appreciate that other forms of media can be utilized within the scope of the present invention.

Figure 7:
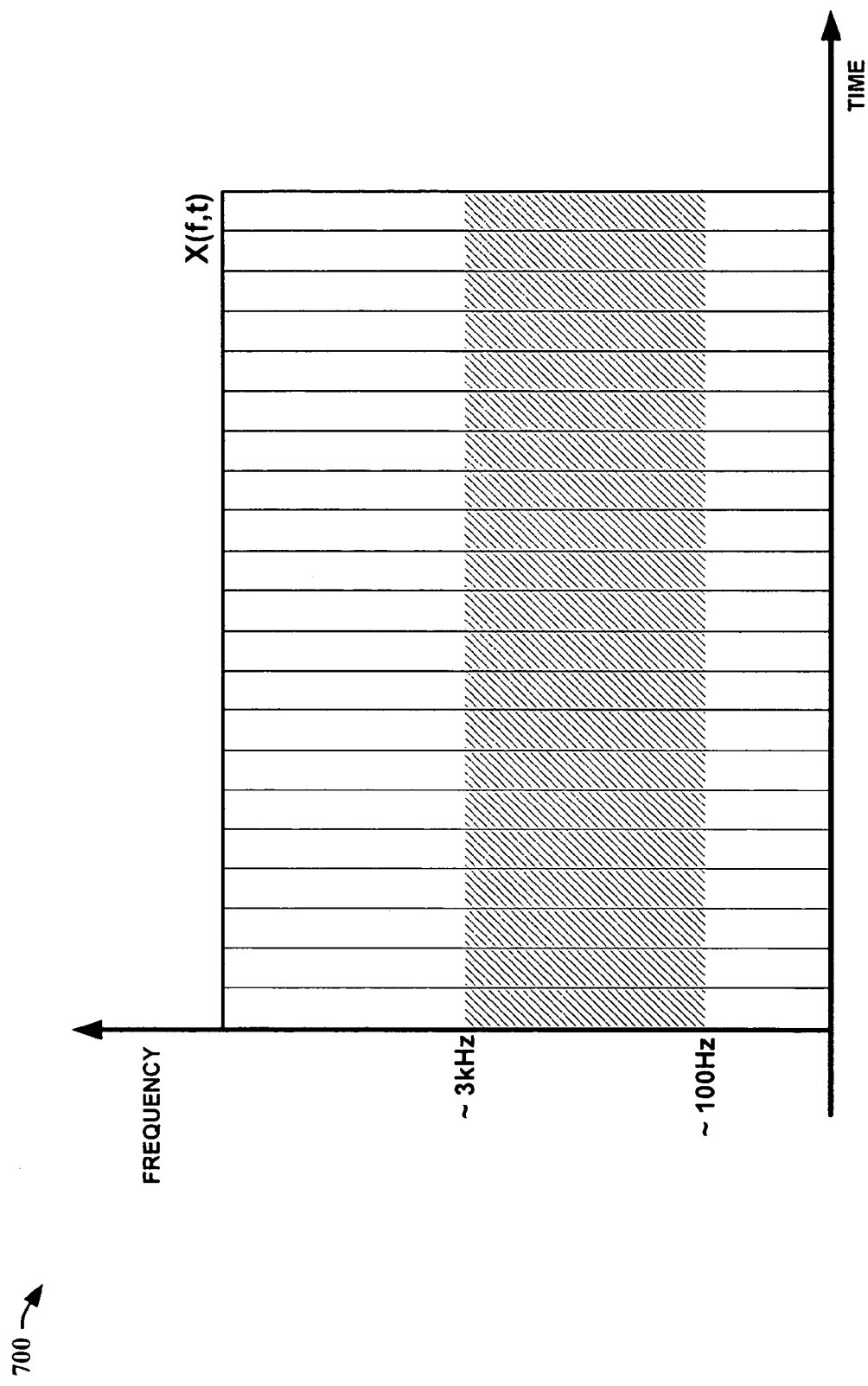
FIG. 7 is an illustration of typical frequencies utilized in mark embedding in accordance with an aspect of the present invention.

In this example of one instance of the present invention, an embedding domain is limited to an approximate frequency range of audio media. For example, consider only audio signals composed of audio clips that have lengths from approximately three to five minutes. The audio signals are thus in the time domain and considered to be one-dimensional media. Therefore, for mark embedding purposes, the audio media is passed through a Modulated Complex Lapped Transformation (MCLT). The logarithm of a magnitude of the transform signal is the domain in which a watermark is embedded. Furthermore, the whole frequency band of the signal is not utilized to embed the watermark. As shown in an illustration 700 in FIG. 7, typical frequencies utilized in this instance of the present invention's watermark embedding is a frequency band from approximately 100 Hz to approximately 3,000 Hz. One skilled in the art will appreciate that the present invention is not limited to only this frequency band. This band is utilized, in this example, due to most frequencies of this particular media having signals within this band. After the transformation, the audio media is in a two-dimensional form. Thus, the signal utilized for embedding purposes can be represented as an M×N matrix, $X(f,t)$, where M is determined by the size of the frequency band and N is determined by the length of the audio clip in this example. For example, for a one minute length of audio media, the matrix $X(f,t)$ has size 300 by 1300.

For consistency, X is utilized to denote the unmarked, transformed source data where a mark is to be embedded. For the embedding procedure, random areas, such as, for example, rectangles, are generated which are overlapping in general. The general process is first applied to a single random area and then described for an instance of the present invention utilizing a plurality of random areas with at least a subset of overlapping areas.

Figure 8:
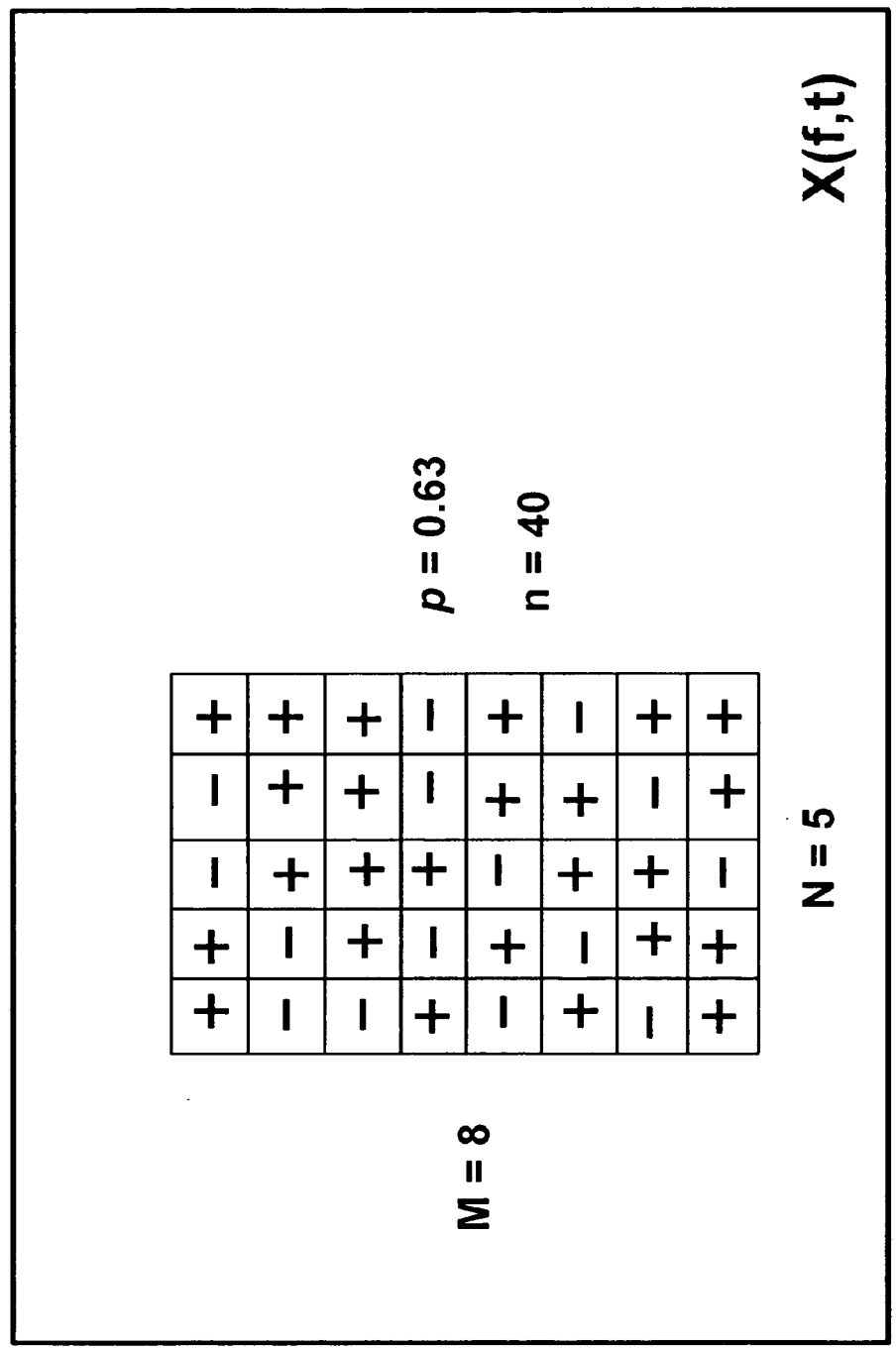
FIG. 8 is an illustration of entry value assignments for a single area in accordance with an aspect of the present invention.

Assume that a random area such as a rectangle is generated whose sides and top-left corner positions are drawn from predetermined distributions. In FIG. 8, an illustration 800 of entry value assignments for a single area in accordance with an aspect of the present invention is shown. The area is a rectangle of size M=8 by N=5. It has 40 entries. For conventional mark embedding schemes, if the mark to be embedded for the rectangle is positive/negative, then all entries of the rectangle are assigned a constant positive/negative value. This gives a serious advantage to a malicious attacker whose purpose is to estimate and extract the embedded mark. To overcome this vulnerability of the scheme, the present invention introduces randomness to the mark generation process. Assume that it is desirable to embed a positive entry value to the rectangle. Instead of assigning a positive entry value to each position, an outcome of independent, identically distributed (iid) Bernoulli processes with parameter p>0.5 is obtained for each position. A Bernoulli process is a discrete-time, stochastic process consisting of a finite or infinite sequence of independent, random variables, $Z_1, Z_2, Z_3, \ldots$, where for each i, a value of $Z_i$ is either 0 or 1 and for all values of i, the probability that $Z_i=1$ is the same number p. For large rectangle areas, the average of the rectangle entries will tend toward 2p−1>0 in the expected sense. An example of this procedure is shown in FIG. 8, where p=0.63. Although a gain in security is achieved by this process, some data rate performance is sacrificed. However, since the present invention's mark embedding procedures operate on low rates (less computationally intensive, therefore, better performance, e.g., utilizing 1 bit in a unit of time instead of 4 bits in the same unit of time, e.g., units of time equals per frame etc.), system performance is not reduced dramatically. Likewise, a detector is modified accordingly, and explained in detail infra.

Figure 9:
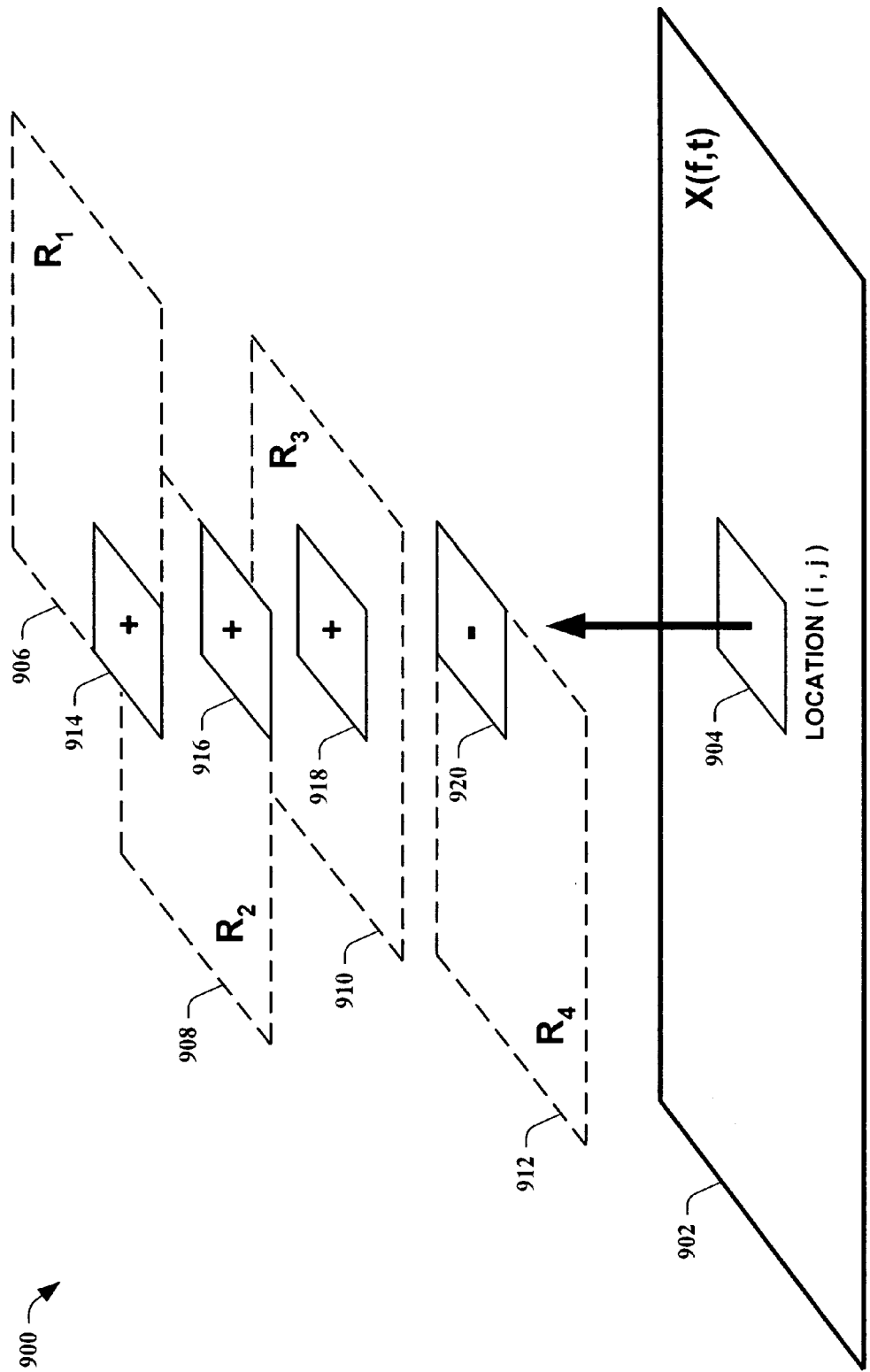
FIG. 9 is an exploded view of entry value assignments for a location included in overlapping areas in accordance with an aspect of the present invention.
Figure 10:
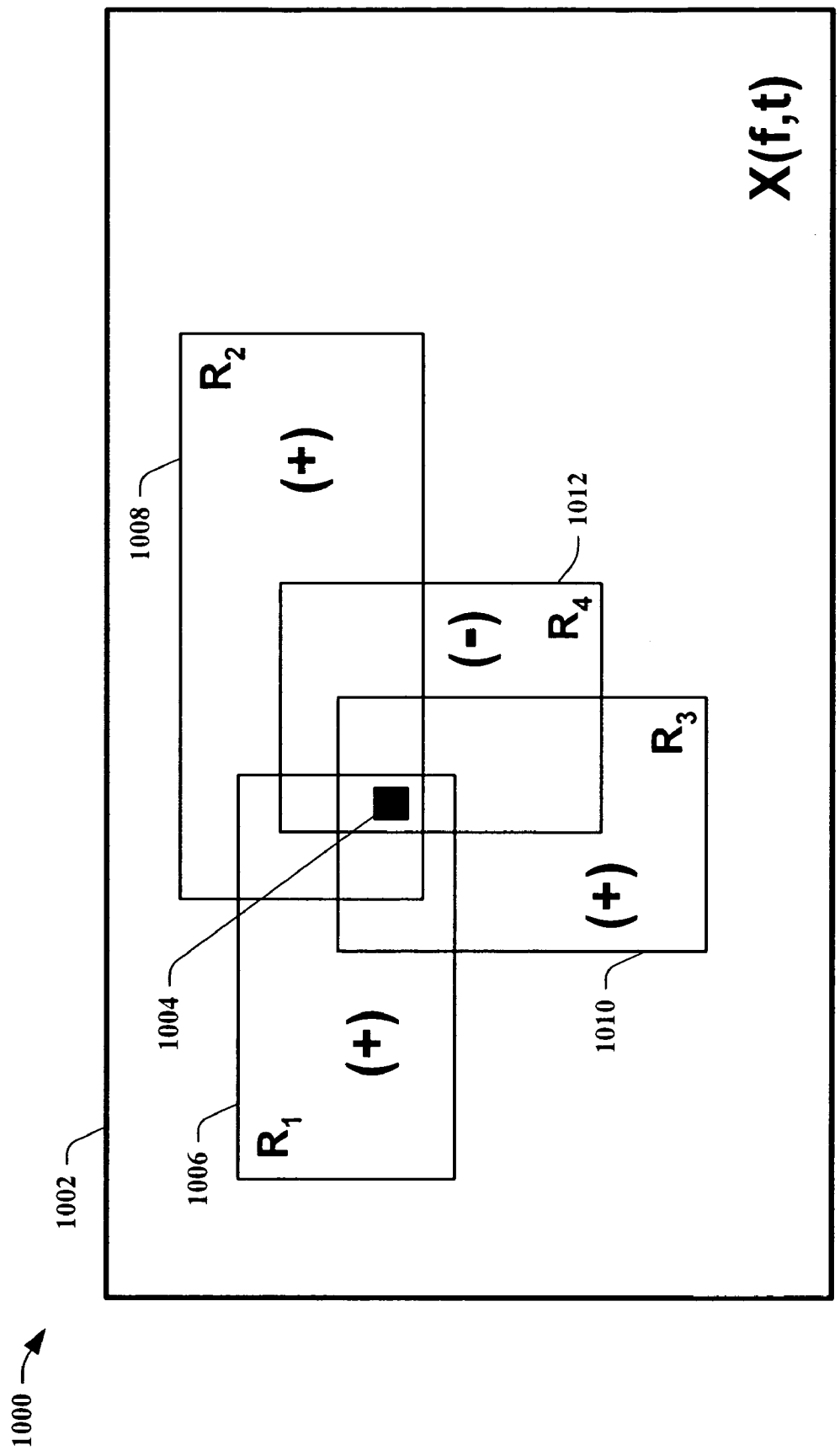
FIG. 10 is a two-dimensional view of entry value assignments for a location included in overlapping areas in accordance with an aspect of the present invention.

The present invention extends the single area process to include multiple, overlapping areas. In FIG. 9, an exploded view 900 is illustrated of entry value assignments for a location (i,j) 904 in two-dimensional media form, $X(f,t)$ 902, included in overlapping subset areas 914-920 of random areas 906-912. The probabilistic process described previously for generating an entry value for the single area relied on, for example, the positive/negative distribution over the 40 divisions in the single area. In a similar fashion, instead of assigning positive/negative values for a division of a random area, each random area is assigned a single positive/negative value and then the entry values of those random areas that overlap a specific location (i,j) are utilized as the distribution in the previous process. In the view 900, four random overlapping areas, $R_1$-$R_4$ 906-912 are shown with their respective entry values (positive/negative signs) and their respective overlapping subset areas 914-920 for location (i,j) 904. FIG. 10 depicts a two-dimensional view 1000 of entry value assignments for a location (i,j) 1004 in two-dimensional media form, X(f,t) 1002, included in overlapping subset areas of random areas 1006-1012. Whereas in FIG. 9 the random areas 906-912 are illustrated in an exploded view, FIG. 10 shows a top-down view of how the random areas 1006-1012 overlap location (i,j) 1004.

As an example of one instance of the present invention, assume that a mark signal for an audio of length one minute is being generated. Approximately 270 random rectangles (areas) are generated, whose sides are drawn from a uniform distribution on the interval [50,55]. An entry value of +1 or −1 is randomly assigned for each rectangle with equal probabilities. An example for a four rectangle case is shown in FIG. 10.

For each entry of X(f,t) of this example, the following algorithm is utilized to determine the level of the mark signal. Fix the location (i,j) of X(f,t). Determine the number of rectangles (i.e., areas) that contain this location and count the number of positive (A) and negative (B) values of those. Based on A and B, calculate the Bernoulli parameter p(i,j) as follows:

If A=B, then p(i,j) is drawn uniformly from (1−p,p)

$$\text{If } A > B, \text{ then } p(i, j) = \frac{p(A + \text{bias}) + (1 - p)B}{A + \text{bias} + B} \quad \text{(Eq. 1)}$$

$$\text{If } A < B, \text{ then } p(i, j) = \frac{pA + (1 - p)(B + \text{bias})}{A + \text{bias} + B} \quad \text{(Eq. 2)}$$

Here, p and bias are system parameters. Set p=0.75 and bias=3 for this example. In one instance of the present invention, these parameters are selected heuristically.

Figure 11:
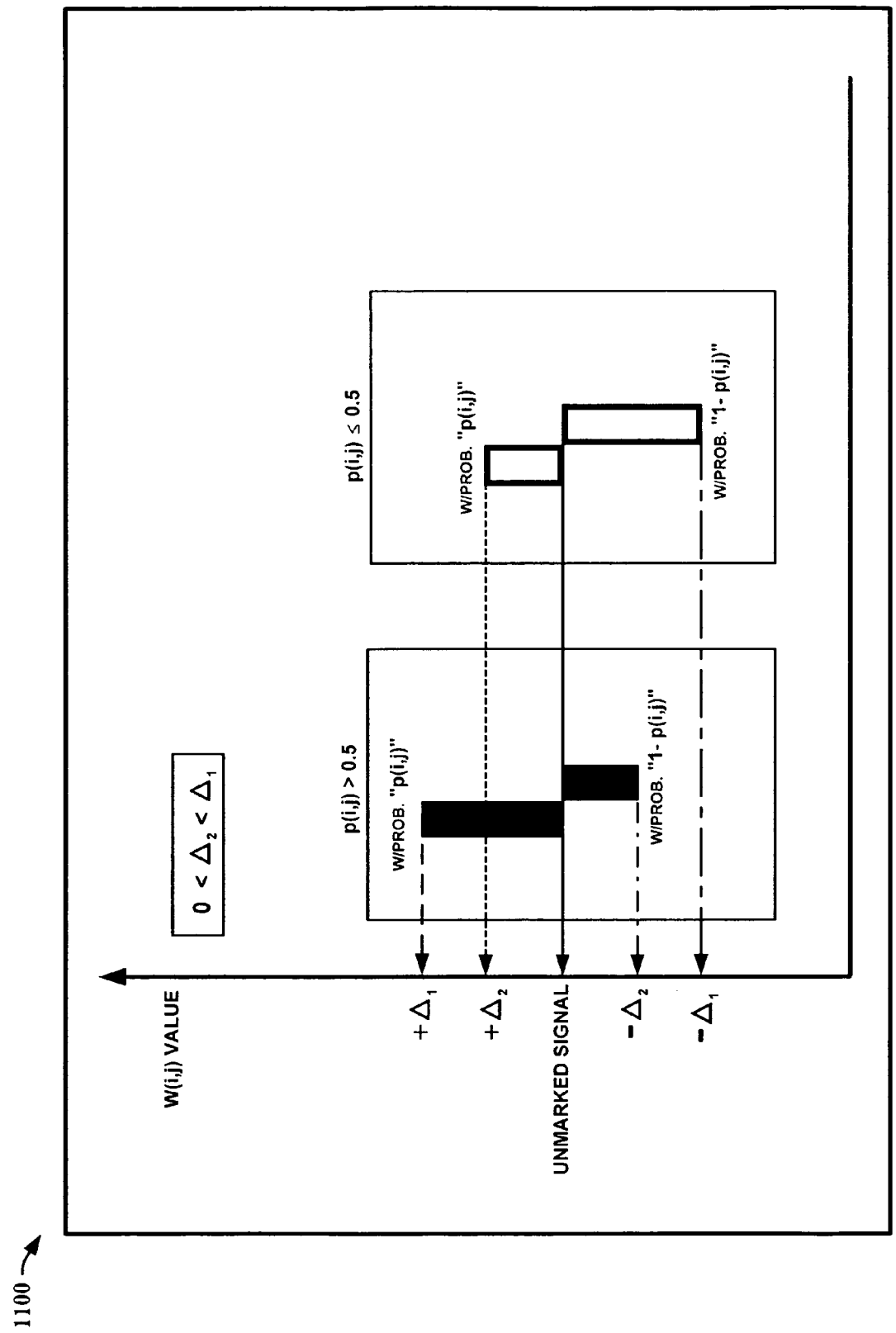
FIG. 11 is a graph illustrating watermark values derived from biased probabilities in accordance with an aspect of the present invention.

Once p(i,j) is calculated, the value to embed in location (i,j) is selected using the realization of a Bernoulli process with parameter p(i,j) (i.e., outcome is +1 with probability p(i,j) and −1 with probability 1−p(i,j)). Then depending on the value of the outcome and p(i,j), the watermark to be embedded, i.e., W(i,j) is determined. This is algorithmically explained below:

Let $0<\Delta_2<\Delta_1$. If,
p(i,j)>0.5
   If Outcome=−1→W(i,j)=−$\Delta_2$
   If Outcome=+1→W(i,j)=+$\Delta_1$
p(i,j)≦0.5
   If Outcome=−1→W(i,j)=−$\Delta_1$
   If Outcome=+1→W(i,j)=+$\Delta_2$ where W(i,j) is the mark value for (i,j) location of X(f,t). In FIG. 11, a graph 1100 is depicted illustrating watermark values derived from biased probabilities in accordance with an aspect of the present invention.

Figure 12:
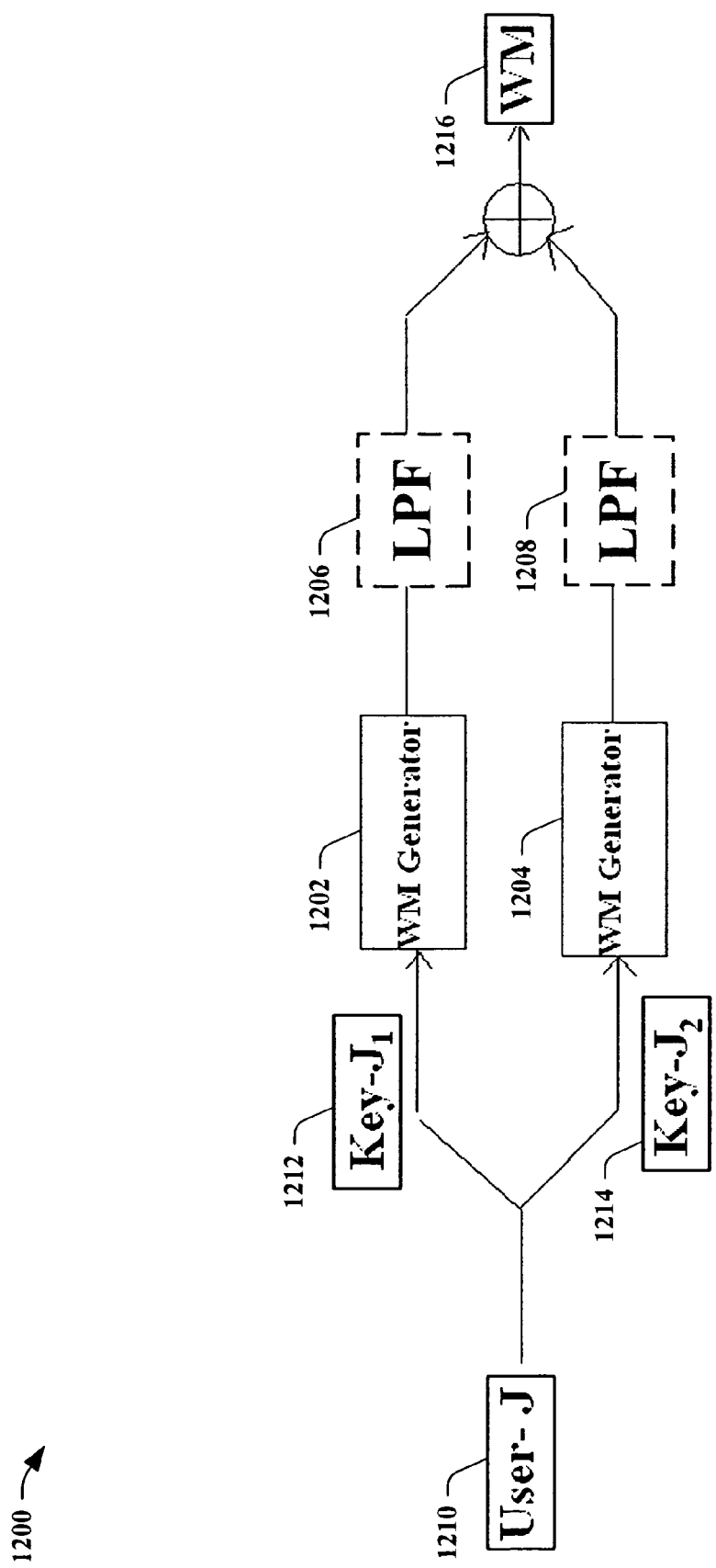
FIG. 12 is a block diagram of a user-unique, dual-mark watermark generation system in accordance with an aspect of the present invention.

In another instance of the present invention, a noise-mask technique is introduced in order to improve the performance of the algorithm against certain types of attacks. The idea is to embed an independent signal on top of the mark signal. This extra noise (also termed as the mark) is also available at the decoder side. The main purpose of the mask is to hide the mark signal further against intelligent extraction attacks and swap attacks. This instance of the present invention goes one step beyond and selects this independent signal as another mark signal dedicated to the same user. In other words, for each user, this instance of the present invention generates two independent mark signals and adds them to the host data. Turning to FIG. 12, a block diagram of a user-unique, dual-mark watermark generation system 1200 in accordance with an aspect of the present invention is illustrated. The system 1200 is comprised of a first watermark generator 1202, a second watermark generator 1204, an optional first low pass filter (LPF) 1206, and an optional second low pass filter (LPF) 1208. A user 1210 is selected and two keys 1212, 1214 for that user 1210 are utilized by each watermark generator 1202, 1204, respectively, to produce two distinct watermarks that are combined to produce a single overall watermark 1216. The optional first and second LPF 1206, 1208 facilitate in smoothing the watermarks after generation and before they are combined to remove any spurious noise. After embedding the mark, this instance of the present invention utilizes the inverse MCLT of the mark embedded audio and obtains the time domain representation of the marked audio. The marked content is assumed to be altered via many kinds of attacks, such as simple additive noise attacks, swap attacks, estimation attacks and various signal processing attacks.

In order to detect the dual-embedded watermarks, one instance of the present invention utilizes the following process for audio media. The log-magnitude of the MCLT of the received time domain audio is passed through a filter, such as, for example, Cepstrum filtering and the like, to reduce the effects of the host data on the detection procedure. One skilled in the art will appreciate that other filtering means can be utilized to accomplish the present invention's process. For each user:

Decode media utilizing first watermark while treating second watermark as known interference;
Decode media utilizing second watermark while treating first watermark as known interference;
Get a combined statistic related to both watermarks;
If greater than a predetermined threshold, declare that a user watermark exists (e.g., User-WM exists); and
If the predetermined threshold is not exceeded, declare no user watermark found (e.g., NO-WM).

The decoding procedure for a User-J and a first watermark, WM-1, with a first key is given as follows:

For each random area (e.g., rectangle), calculate the mean of the coefficients of each area;
Subtract the effect of the second watermark from the mean and set equal to μ;
Define:

$$\Theta = [\mu_1, \mu_2, \ldots, \mu_N]^T; \quad \text{(Eq. 3)}$$

where N is the total number of random areas (e.g., rectangles) and $(.)^T$ represents the transpose operator;

$$\Omega_i = [\omega_{i1}\text{sgn}(R_1), \omega_{i2}\text{sgn}(R_2), \ldots, \omega_{iN}\text{sgn}(R_N)]^T, \quad \text{(Eq. 4)}$$

$$\omega_{ij} \geq 0, \forall i \in \{1, 2, \ldots, K\}, \forall j \in \{1, 2, \ldots, N\}$$

$$\sum_{j=1}^{N} \omega_{ij} = N, \forall i \in \{1, 2, \ldots, K\}$$

where $\omega_{ij}$ is the watermark value at location (i,j), $\{R_i\}$ represent random areas, such as, for example, rectangles, and "sgn" denotes a random area coefficient, such as, for example, signs or positive/negative coefficients (i.e., +1, −1 coefficients), Therefore, the Decision Statistic for User-J is given as:

$$\xi(J,1)=E[BPF\{<\Omega_i,\Theta>\}];\quad\quad\quad\text{(Eq. 5)}$$

where < > is the inner product, BPF is band pass filtering, and E[ ] is the expectation.

The above steps are then repeated for the second watermark utilizing a second key of the User-J.

After obtaining the two decision statistics for each user, check if:

$$\max_J\{\max(\xi(J,1),\xi(J,2))\}>\tau;\quad\quad\quad\text{(Eq. 6)}$$

where τ is the decision threshold. If the threshold is exceeded, the User-J mark is declared to exist, where J is the user whose decision statistic is the maximum among all users. If the threshold is not exceeded then NO-MARK is declared.

The present invention is inherently resistant to Estimation Attacks and especially resistant against swap type of attacks, Stirmark-Audio Pack type of attacks (see generally, http://www.petitcolas.net/fabien/watermarking/stirmark/) and a variety of signal processing type of attacks. It further possesses substantial performance characteristics against collusion type of attacks (more than one attacker acting together to create an attack).

In view of the exemplary systems shown and described above, methodologies that may be implemented in accordance with the present invention will be better appreciated with reference to the flow charts of FIGS. 13-17. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Figure 13:
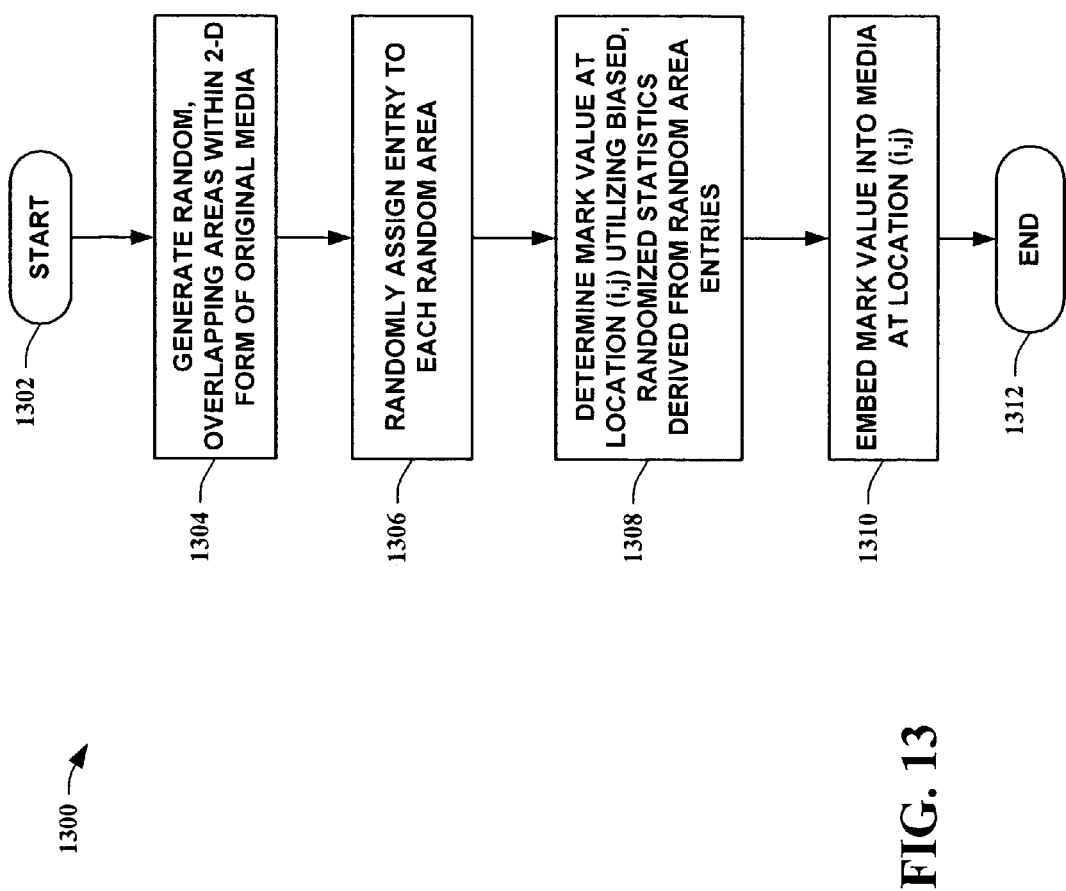
FIG. 13 is a flow diagram of a method of facilitating media watermark embedding in accordance with an aspect of the present invention.

In FIG. 13, a flow diagram of a method 1300 of facilitating media watermark embedding in accordance with an aspect of the present invention is shown. The method 1300 starts 1302 by generating random areas with a subset of overlapping areas within a two-dimensional form of an original media 1304. The random areas can be, for example, rectangles, circles, triangles, and squares and the like. The overlapping areas of the random areas provide multiple entry values for a location found within the overlapping areas. The two-dimensional form of the original media provides an ability to map randomized areas to characteristics of the media. In one instance of the present invention, for example, audio media is transformed utilizing an MCLT process to provide a two-dimensional form of the audio signal. Each random area is then randomly assigned an entry value 1306. A user-unique key is typically utilized during the assigning to provide user-uniqueness to the entry values. Entry values can include, but are not limited to, such values (i.e., area coefficients) as "+1" and "−1" and the like. When coefficients +/−1 are utilized, they are sometimes referred to as "signs" (i.e., plus/minus values) of the random areas. Any entry value process that can provide a statistical basis for the random areas can be employed. A mark value is then determined at a location (i,j) within the two-dimensional form of the media utilizing biased, randomized statistics derived from the random area entry values 1308. The biased, randomized statistics are determined for the location (i,j) by utilizing the entry values assigned to all random areas that overlap the location (i,j). Thus, each coefficient (entry value) of each overlapping random area for that location contributes to the statistics. If bi-value entry values are utilized, counts of each type of value, such as, for example, number of plus signs assigned to each random overlapping area and number of minus signs assigned to each random overlapping area at the location (i,j), can be employed as a basis for biasing statistics for the location. In the prior example of one instance of the present invention, an MCLT process was utilized to provide a two-dimensional form of the audio media. For this example, the value of the watermark is then determined based upon a logarithmic magnitude scale (e.g., dB units, etc.). The mark value is then embedded into the media at location (i,j) 1310, ending the flow 1312. Typically, media is transformed back into its original dimensional form after the watermark is embedded into it.

Figure 14:
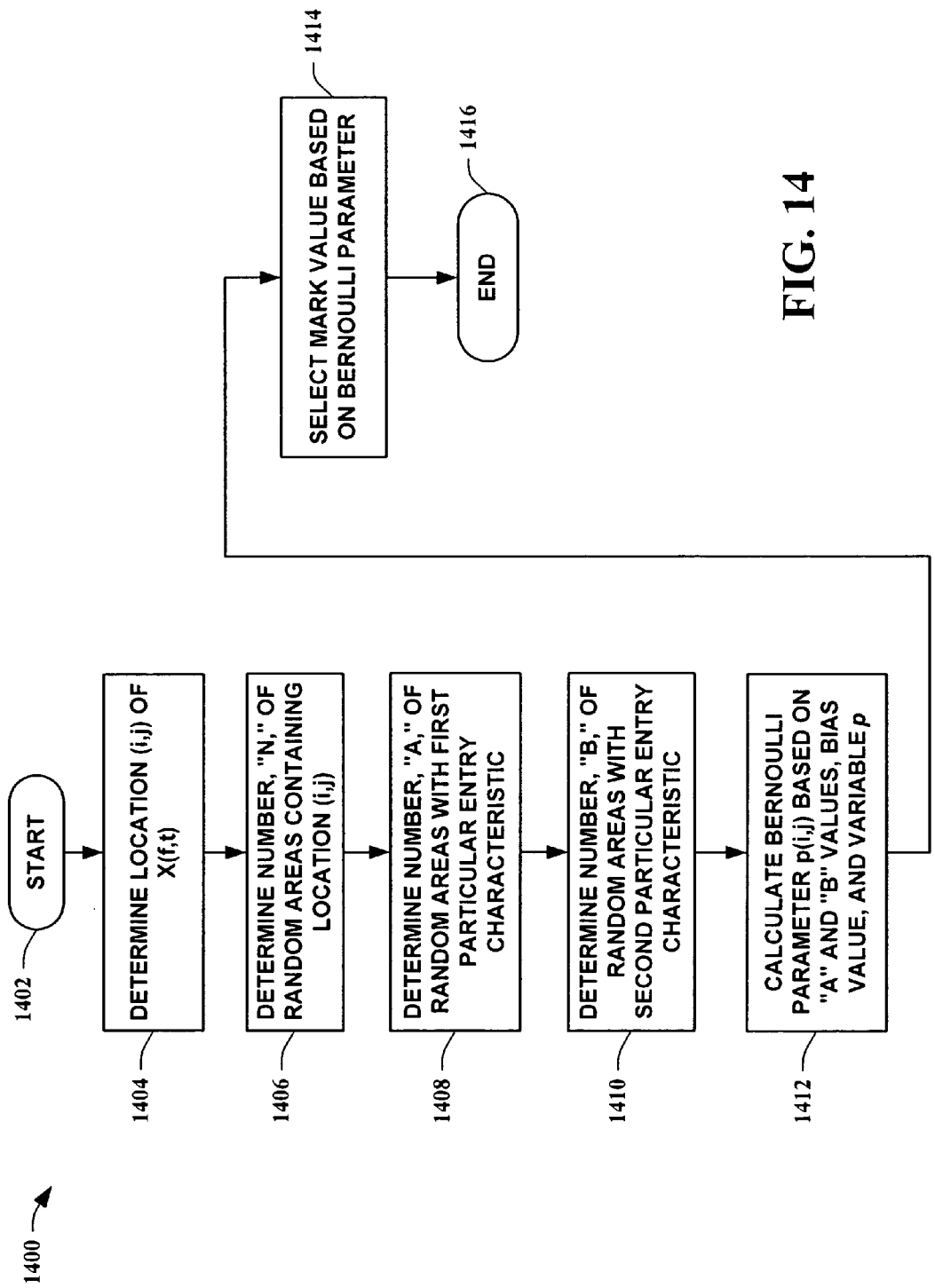
FIG. 14 is a flow diagram of a method of determining a watermark value in accordance with an aspect of the present invention.

Turning to FIG. 14, a flow diagram of a method 1400 of determining a watermark value in accordance with an aspect of the present invention is depicted. The method 1400 starts 1402 by determining a location (i,j) of a two-dimensional media form, X(f,t), for audio media 1404. A number denoted by "N" of all random areas containing location (i,j) is determined for X(f,t) 1406. A number denoted by "A" of all random areas with a first particular entry characteristic is then determined 1408. The first particular entry characteristic can include, for example, how many entry values are positive (i.e., plus signs or coefficients of +1) of all the random areas. A number denoted by "B" of all random areas with a second particular entry characteristic is then determined 1410. The second particular entry characteristic can include, for example, how many entry values are negative (i.e., minus signs or coefficients of −1) of all the random areas. Values of A and B are utilized to calculate a Bernoulli parameter p(i,j) along with specified parameters that include a bias value and a variable probability p 1412. The bias value is added to the A or B value in order to increase the difference between the two values in the Bernoulli parameter p(i,j). In one instance of the present invention, the bias value is added to the value of A or B based on which value is greatest. Therefore, if A>B, the bias is added to A. If B>A, the bias is added to B. For example:

$$\text{If }A>B,\text{ then }p(i,j)=\frac{p(A+\text{bias})+(1-p)B}{A+\text{bias}+B}\quad\quad\text{(Eq. 1)}$$

$$\text{If }A<B,\text{ then }p(i,j)=\frac{pA+(1-p)(B+\text{bias})}{A+\text{bias}+B}\quad\quad\text{(Eq. 2)}$$

If A=B, then p(i,j) is drawn uniformly from (1−p,p). The Bernoulli parameter is then utilized to select a watermark value for location (i,j) 1414, ending the flow 1416. For example, if p(i,j)>0.5, it is statistically more likely that location (i,j) has an overall positive entry value based upon the above example. Thus, a watermark magnitude selected to indicate such a characteristic can be added to the media at this location (e.g., a positive delta value). Similarly, if p(i,j)<0.5, it is statistically more likely location (i,j) has an overall negative entry value based upon the above example. In this case, a watermark magnitude selected to indicate such a characteristic can be added to the media at this location (e.g., a negative delta value).

Figure 15:
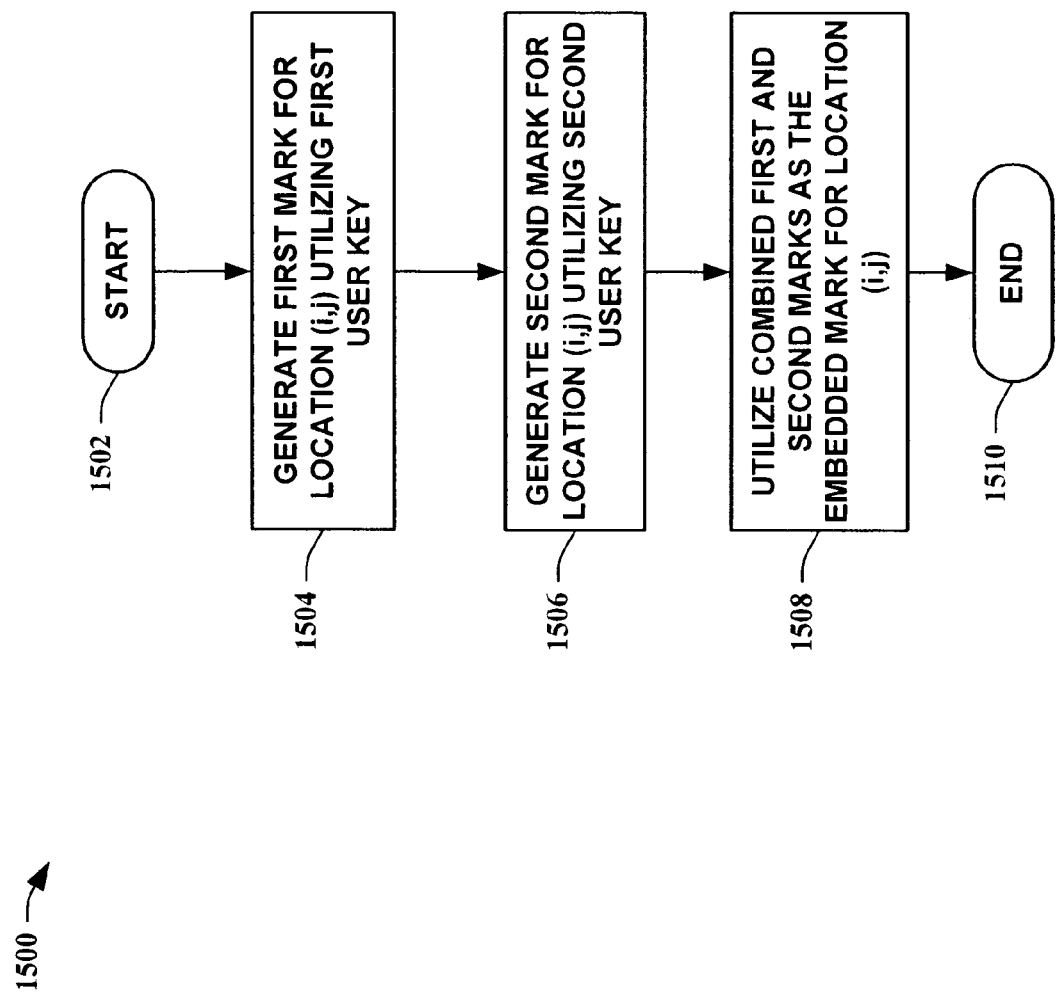
FIG. 15 is a flow diagram of a method of determining a user-unique, dual-mark watermark in accordance with an aspect of the present invention.

Referring to FIG. 15, a flow diagram of a method 1500 of determining a user-unique, dual-mark watermark in accordance with an aspect of the present invention is illustrated. The method 1500 starts 1502 by generating a first mark for a location (i,j) utilizing a first key for a user 1504. A second mark is then generated for the location (i,j) utilizing a second key for the same user 1506. The first and second marks are then combined (via addition) into a single watermark for location (i,j) which is embedded into a media 1508, ending the flow 1510. If the watermark is comprised of multiple distinct watermarks based on different keys for a single user, each separate watermark can be detected separately while the other watermark is processed as noise. Then a determination can be made, based on detection of either key, that a specific user's watermark is present. This provides added robustness to the watermarking provided by the present invention.

Figure 16:
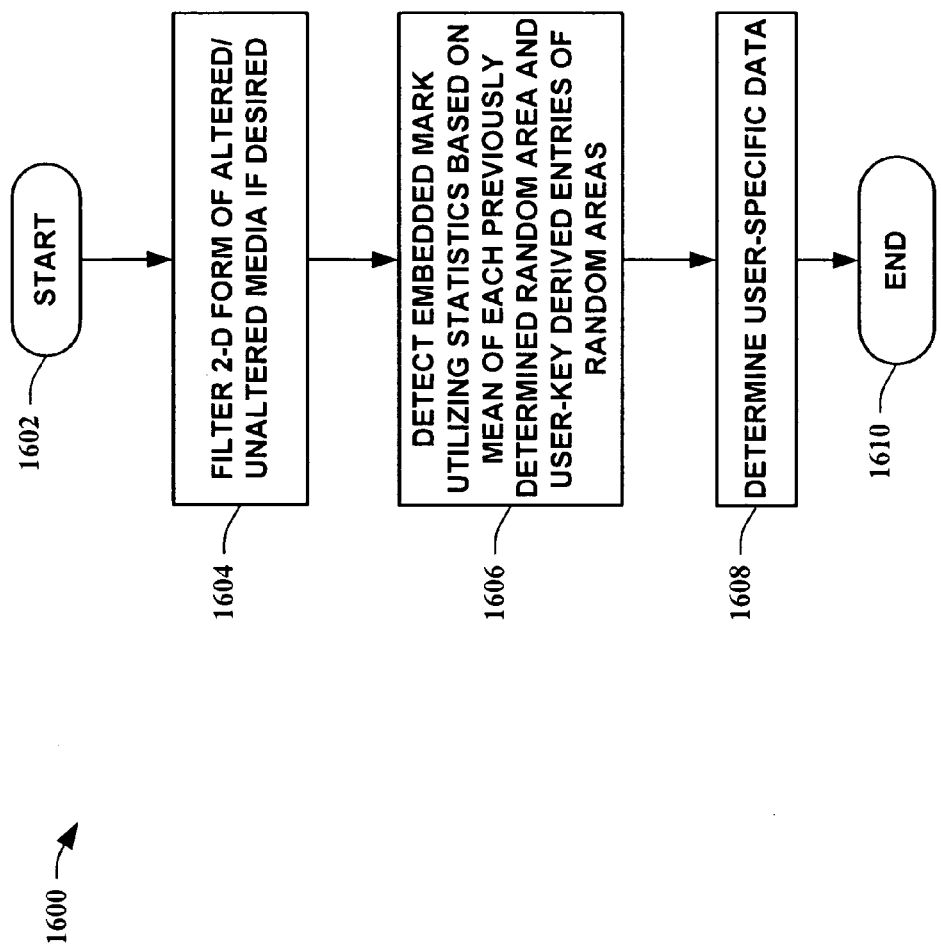
FIG. 16 is a flow diagram of a method of facilitating media watermark detecting in accordance with an aspect of the present invention.

Looking at FIG. 16, a flow diagram of a method 1600 of facilitating media watermark detecting in accordance with an aspect of the present invention is shown. The method 1600 starts 1602 by filtering a two-dimensional form of an altered/unaltered media if desired 1604. This filtering of the media facilitates in watermark detection and can include, but is not limited to, such types of filtering as Cepstrum filtering and the like. An embedded watermark is then detected utilizing statistics based on the mean of each previously determined random area and user-key derived entry values of the random areas 1606. A detected watermark is then utilized to determine user-specific data associated with the watermark 1608, ending the flow 1610.

Figure 17:
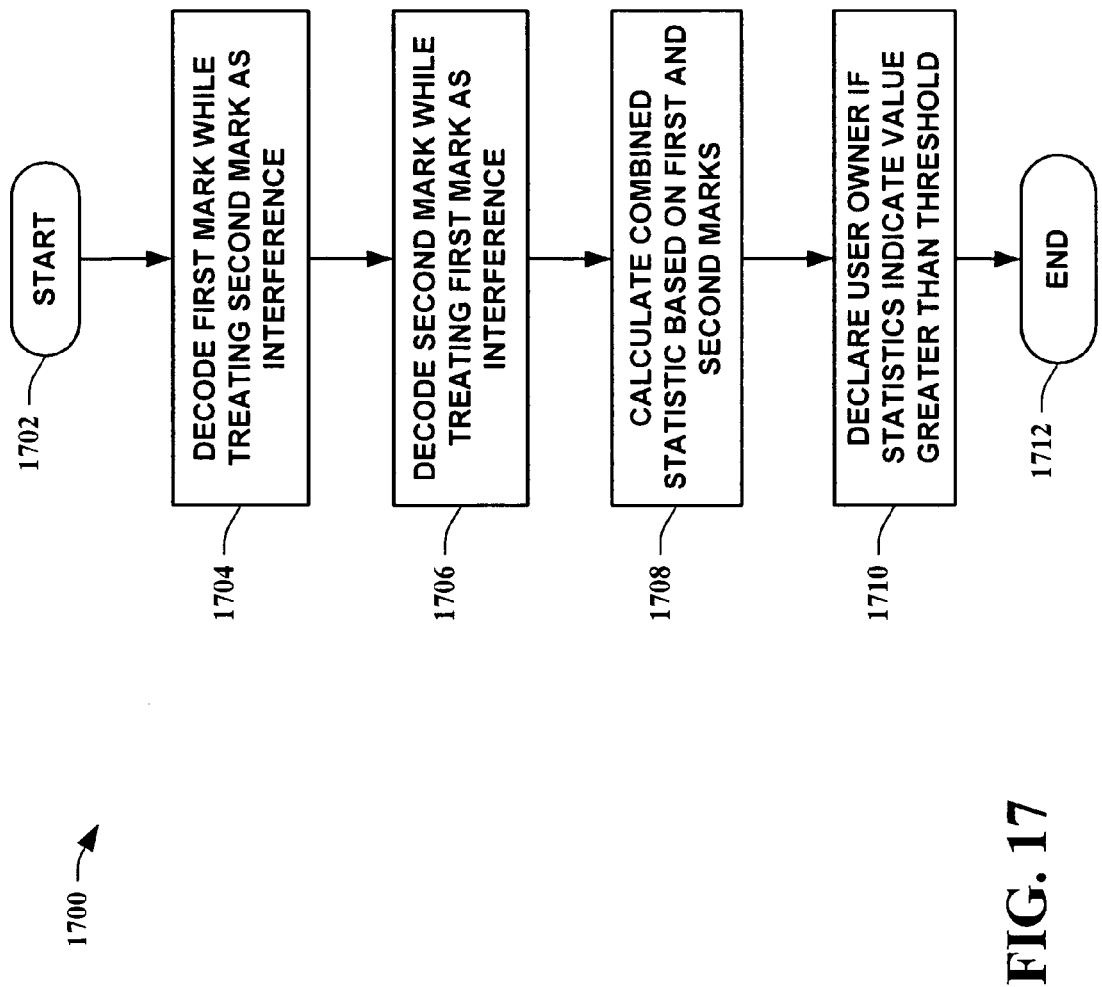
FIG. 17 is a flow diagram of a method of facilitating user-unique, dual-mark watermark detecting in accordance with an aspect of the present invention.

In FIG. 17, a flow diagram of a method 1700 of facilitating user-unique, dual-mark watermark detecting in accordance with an aspect of the present invention is depicted. The method 1700 starts 1702 by decoding a first mark while treating a second mark as noise interference 1704. A second mark is then decoded while treating the first mark as noise interference 1706. A combined statistic is then calculated based on the first and second marks 1708. If the statistic indicates a value greater than a threshold value for a particular user, that user is declared as an owner of the watermarked media 1710, ending the flow 1712.

Figure 18:
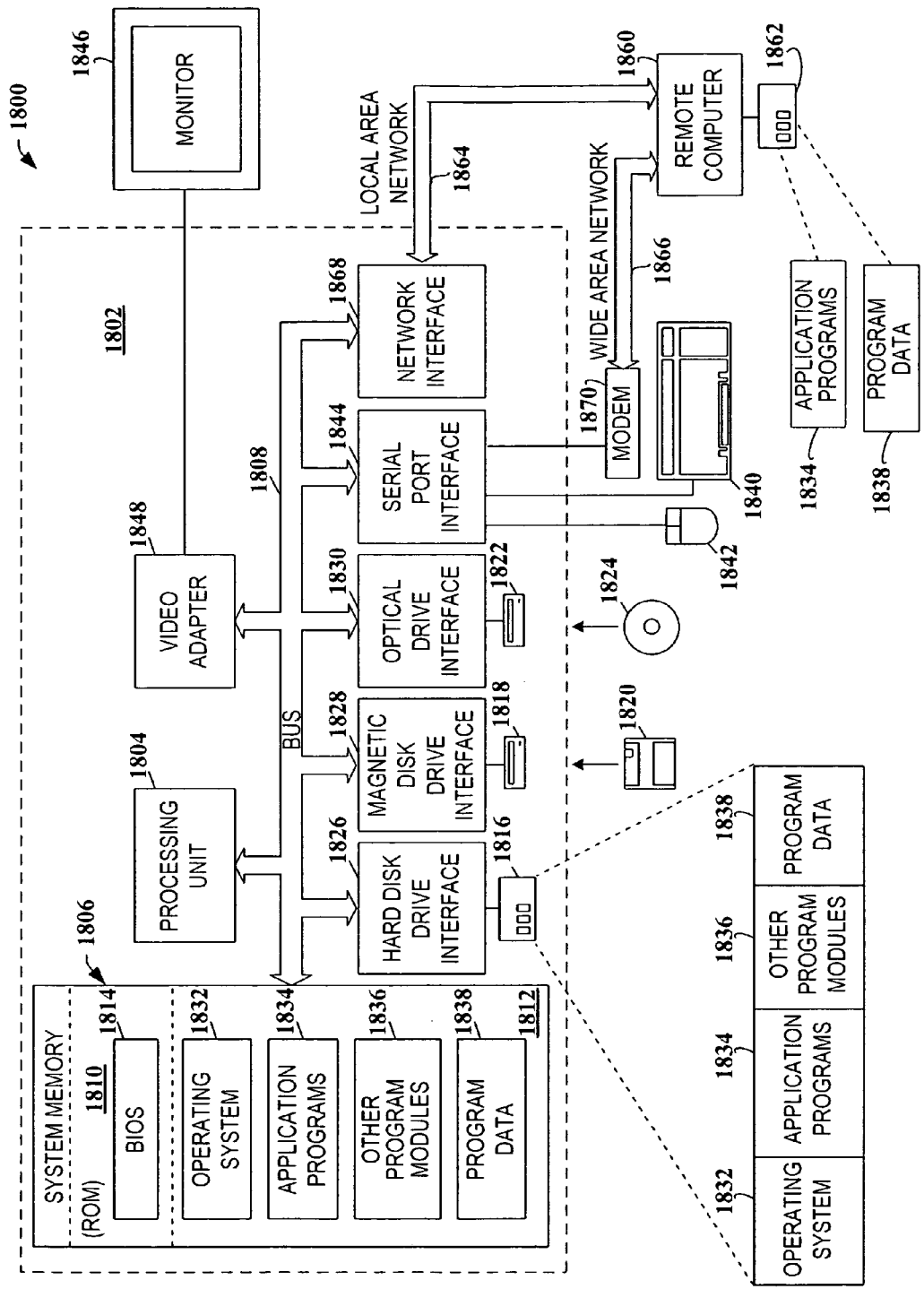
FIG. 18 illustrates an example operating environment in which the present invention can function.

In order to provide additional context for implementing various aspects of the present invention, FIG. 18 and the following discussion is intended to provide a brief, general description of a suitable computing environment 1800 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 18, an exemplary system environment 1800 for implementing the various aspects of the invention includes a conventional computer 1802, including a processing unit 1804, a system memory 1806, and a system bus 1808 that couples various system components, including the system memory, to the processing unit 1804. The processing unit 1804 may be any commercially available or proprietary processor. In addition, the processing unit may be implemented as multi-processor formed of more than one processor, such as may be connected in parallel.

The system bus 1808 may be any of several types of bus structure including a memory bus or memory controller, a peripheral bus, and a local bus using any of a variety of conventional bus architectures such as PCI, VESA, Microchannel, ISA, and EISA, to name a few. The system memory 1806 includes read only memory (ROM) 1810 and random access memory (RAM) 1812. A basic input/output system (BIOS) 1814, containing the basic routines that help to transfer information between elements within the computer 1802, such as during start-up, is stored in ROM 1810.

The computer 1802 also may include, for example, a hard disk drive 1816, a magnetic disk drive 1818, e.g., to read from or write to a removable disk 1820, and an optical disk drive 1822, e.g., for reading from or writing to a CD-ROM disk 1824 or other optical media. The hard disk drive 1816, magnetic disk drive 1818, and optical disk drive 1822 are connected to the system bus 1808 by a hard disk drive interface 1826, a magnetic disk drive interface 1828, and an optical drive interface 1830, respectively. The drives 1816-1822 and their associated computer-readable media provide nonvolatile storage of data, data structures, computer-executable instructions, etc. for the computer 1802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1800, and further that any such media may contain computer-executable instructions for performing the methods of the present invention.

A number of program modules may be stored in the drives 1816-1822 and RAM 1812, including an operating system 1832, one or more application programs 1834, other program modules 1836, and program data 1838. The operating system 1832 may be any suitable operating system or combination of operating systems. By way of example, the application programs 1834 and program modules 1836 can include a watermark embedding and/or detection scheme in accordance with an aspect of the present invention.

A user can enter commands and information into the computer 1802 through one or more user input devices, such as a keyboard 1840 and a pointing device (e.g., a mouse 1842).

Other input devices (not shown) may include a microphone, a joystick, a game pad, a satellite dish, wireless remote, a scanner, or the like. These and other input devices are often connected to the processing unit 1804 through a serial port interface 1844 that is coupled to the system bus 1808, but may be connected by other interfaces, such as a parallel port, a game port or a universal serial bus (USB). A monitor 1846 or other type of display device is also connected to the system bus 1808 via an interface, such as a video adapter 1848. In addition to the monitor 1846, the computer 1802 may include other peripheral output devices (not shown), such as speakers, printers, etc.

It is to be appreciated that the computer 1802 can operate in a networked environment using logical connections to one or more remote computers 1860. The remote computer 1860 may be a workstation, a server computer, a router, a peer device or other common network node, and typically includes many or all of the elements described relative to the computer 1802, although, for purposes of brevity, only a memory storage device 1862 is illustrated in FIG. 18. The logical connections depicted in FIG. 18 can include a local area network (LAN) 1864 and a wide area network (WAN) 1866. Such networking environments are commonplace in offices, enterprise-wide computer networks, intranets and the Internet.

When used in a LAN networking environment, for example, the computer 1802 is connected to the local network 1864 through a network interface or adapter 1868. When used in a WAN networking environment, the computer 1802 typically includes a modem (e.g., telephone, DSL, cable, etc.) 1870, or is connected to a communications server on the LAN, or has other means for establishing communications over the WAN 1866, such as the Internet. The modem 1870, which can be internal or external relative to the computer 1802, is connected to the system bus 1808 via the serial port interface 1844. In a networked environment, program modules (including application programs 1834) and/or program data 1838 can be stored in the remote memory storage device 1862. It will be appreciated that the network connections shown are exemplary and other means (e.g., wired or wireless) of establishing a communications link between the computers 1802 and 1860 can be used when carrying out an aspect of the present invention.

In accordance with the practices of persons skilled in the art of computer programming, the present invention has been described with reference to acts and symbolic representations of operations that are performed by a computer, such as the computer 1802 or remote computer 1860, unless otherwise indicated. Such acts and operations are sometimes referred to as being computer-executed. It will be appreciated that the acts and symbolically represented operations include the manipulation by the processing unit 1804 of electrical signals representing data bits which causes a resulting transformation or reduction of the electrical signal representation, and the maintenance of data bits at memory locations in the memory system (including the system memory 1806, hard drive 1816, floppy disks 1820, CD-ROM 1824, and remote memory 1862) to thereby reconfigure or otherwise alter the computer system's operation, as well as other processing of signals. The memory locations where such data bits are maintained are physical locations that have particular electrical, magnetic, or optical properties corresponding to the data bits.

Figure 19:
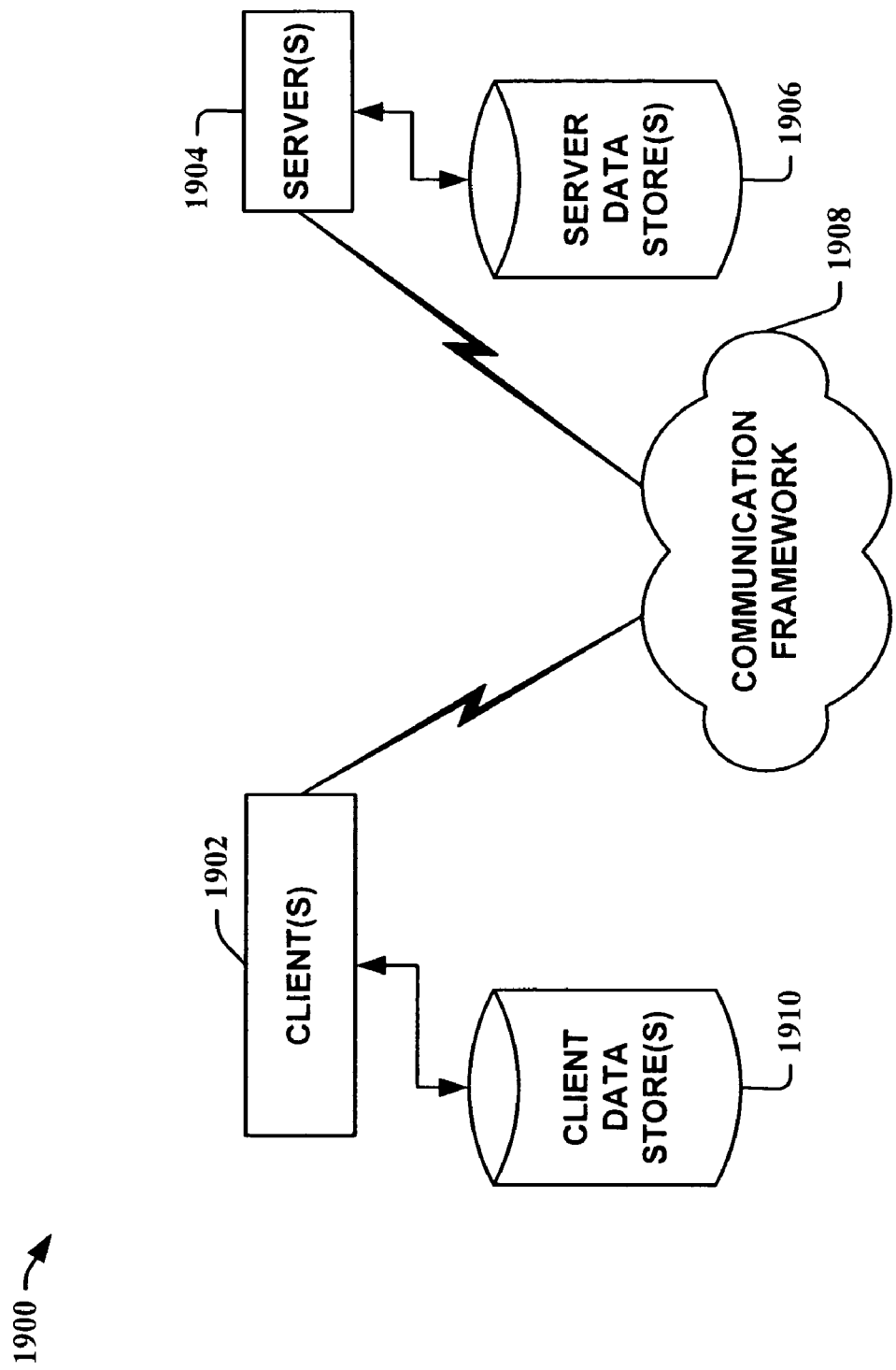
FIG. 19 illustrates another example operating environment in which the present invention can function.

FIG. 19 is another block diagram of a sample computing environment 1900 with which the present invention can interact. The system 1900 further illustrates a system that includes one or more client(s) 1902. The client(s) 1902 can be hardware and/or software (e.g., threads, processes, computing devices). The system 1900 also includes one or more server(s) 1904. The server(s) 1904 can also be hardware and/or software (e.g., threads, processes, computing devices). The server(s) 1904 can house threads to perform transformations by employing the present invention, for example. One possible communication between a client 1902 and a server 1904 may be in the form of a data packet adapted to be transmitted between two or more computer processes. The system 1900 includes a communication framework 1908 that can be employed to facilitate communications between the client(s) 1902 and the server(s) 1904. The client(s) 1902 are connected to one or more client data store(s) 1910 that can be employed to store information local to the client(s) 1902. Similarly, the server(s) 1904 are connected to one or more server data store(s) 1906 that can be employed to store information local to the server(s) 1904.

In one instance of the present invention, a data packet transmitted between two or more computer components that facilitates watermarking media is comprised of, at least in part, information relating to a media watermarking system that utilizes, at least in part, biased, randomized statistics that employ at least one subset of random, overlapping areas with respective entry values of a two-dimensional media form to determine at least one media mark value.

It is to be appreciated that the systems and/or methods of the present invention can be utilized in media watermark facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating media watermarking, comprising:
   utilizing, at least in part, biased, randomized statistics to determine at least one mark value for media by generating random areas with a subset of overlapping areas within a two-dimensional form of the media, randomly assigning an entry value to each random area utilizing a user key, and determining the mark value at a particular location of the two-dimensional media form utilizing at least one Bernoulli parameter derived from the random area entry values;
   determining the mark value by determining a number of random areas containing the particular location, determining a number of random areas containing the particular location with a first particular entry characteristic, determining a number of random areas containing the particular location with a second particular entry characteristic, calculating a Bernoulli parameter based, at least in part, on the first and second particular entry characteristics and a bias value, and selecting the mark value based on the Bernoulli parameter, wherein the Bernoulli parameter calculated utilizing at least one equation:

$$A = B, p(i,j) = \text{drawn uniformly from } (1-p, p);$$

where A denotes a number of random areas possessing the first particular entry characteristic, B denotes a number of random areas possessing the second particular entry characteristic, p denotes a predetermined probability variable, bias denotes the bias value, and p(i,j) denotes the Bernoulli parameter for location (i,j) within the two-dimensional form of the media;

embedding the mark value into at least one location in the media, and recording the media containing the embedded mark value on a computer-readable storage medium.

2. The method of claim 1, the two-dimensional form of the digital media comprising a form generated by a Short-Time Fourier Transform (STFT) method applied to a time-domain audio signal.

3. The method of claim 2, the Short-Time Fourier Transform (STFT) comprising a Modulated Complex Lapped Transformation (MCLT) method.

4. The method of claim 1, the digital media comprising an audio signal.

5. The method of claim 4, embedding the mark value into the digital media further comprising:

limiting the mark value embedding locations to a range of audio signal frequencies from 100 Hz to 3,000 Hz in the audio signal.

6. A computing device employing the method of claim 1 comprising at least one computing environment selected from the group consisting of a computer, a server, and a handheld electronic device.

7. A method for facilitating media watermarking, comprising:

utilizing, at least in part, biased, randomized statistics to determine at least one mark value for media by generating random areas with a subset of overlapping areas within a two-dimensional form of the media, randomly assigning an entry value to each random area utilizing a user key, and determining the mark value at a particular location of the two-dimensional media form utilizing at least one Bernoulli parameter derived from the random area entry values;

determining the mark value by determining a number of random areas containing the particular location, determining a number of random areas containing the particular location with a first particular entry characteristic, determining a number of random areas containing the particular location with a second particular entry characteristic, calculating a Bernoulli parameter based, at least in part, on the first and second particular entry characteristics and a bias value, and selecting the mark value based on the Bernoulli parameter, wherein the Bernoulli parameter calculated utilizing at least one equation $$A > B, \; p(i, j) = \frac{p(A + bias) + (1 - p)B}{A + bias + B};$$

where A denotes a number of random areas possessing the first particular entry characteristic, B denotes a number of random areas possessing the second particular entry characteristic, p denotes a predetermined probability variable, bias denotes the bias value, and p(i, j) denotes the Bernoulli parameter for location (i, j) within the two-dimensional form of the media;

embedding the mark value into at least one location in the media; and recording the media containing the embedded mark value on a computer-readable storage medium.

8. The method of claim 7, the two-dimensional form of the digital media comprising a form generated by a Short-Time Fourier Transform (STFT) method applied to a time-domain audio signal.

9. The method of claim 8, the Short-Time Fourier Transform (STFT) comprising a Modulated Complex Lapped Transformation (MCLT) method.

10. The method of claim 7, the digital media comprising an audio signal.

11. The method of claim 10, embedding the mark value into the digital media further comprising:

limiting the mark value embedding locations to a range of audio signal frequencies from 100 Hz to 3,000 Hz in the audio signal.

12. A computing device employing the method of claim 7 comprising at least one computing environment selected from the group consisting of a computer, a server, and a handheld electronic device.

13. A method for facilitating media watermarking, comprising:

utilizing, at least in part, biased, randomized statistics to determine at least one mark value for media by generating random areas with a subset of overlapping areas within a two-dimensional form of the media, randomly assigning an entry value to each random area utilizing a user key, and determining the mark value at a particular location of the two-dimensional media form utilizing at least one Bernoulli parameter derived from the random area entry values;

determining the mark value by determining a number of random areas containing the particular location, determining a number of random areas containing the particular location with a first particular entry characteristic, determining a number of random areas containing the particular location with a second particular entry characteristic, calculating a Bernoulli parameter based, at least in part, on the first and second particular entry characteristics and a bias value, and selecting the mark value based on the Bernoulli parameter, wherein the Bernoulli parameter calculated utilizing at least one equation $$A < B, \; \text{then } p(i, j) = \frac{pA + (1 - p)(B + bias)}{A + bias + B};$$

where A denotes a number of random areas possessing the first particular entry characteristic, B denotes a number of random areas possessing the second particular entry characteristic, p denotes a predetermined probability variable, bias denotes the bias value, and p(i,j) denotes the Bernoulli parameter for location (i,j) within the two-dimensional form of the media;

embedding the mark value into at least one location in the media; and recording the media containing the embedded mark value on a computer-readable storage medium.

14. The method of claim 13, the two-dimensional form of the digital media comprising a form generated by a Short-Time Fourier Transform (STFT) method applied to a time-domain audio signal.

15. The method of claim 14, the Short-Time Fourier Transform (STFT) comprising a Modulated Complex Lapped Transformation (MCLT) method.

16. The method of claim 13, the digital media comprising an audio signal.

17. The method of claim 16, embedding the mark value into the digital media further comprising:

limiting the mark value embedding locations to a range of audio signal frequencies from 100 Hz to 3,000 Hz in the audio signal.

18. A computing device employing the method of claim 13 comprising at least one computing environment selected from the group consisting of a computer, a server, and a handheld electronic device.

* * * * *